(12) United States Patent
Nakashima et al.

(10) Patent No.: US 10,508,735 B2
(45) Date of Patent: Dec. 17, 2019

(54) CONTROLLER OF TOROIDAL CONTINUOUSLY VARIABLE TRANSMISSION

(71) Applicant: KAWASAKI JUKOGYO KABUSHIKI KAISHA, Kobe-shi, Hyogo (JP)

(72) Inventors: Kenichi Nakashima, Kobe (JP); Tatsuhiko Goi, Kobe (JP); Koji Watanabe, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/082,586

(22) PCT Filed: Mar. 7, 2016

(86) PCT No.: PCT/JP2016/001221
§ 371 (c)(1),
(2) Date: Sep. 6, 2018

(87) PCT Pub. No.: WO2017/154033
PCT Pub. Date: Sep. 14, 2017

(65) Prior Publication Data
US 2019/0078683 A1   Mar. 14, 2019

(51) Int. Cl.
*F16H 59/72* (2006.01)
*F16H 61/02* (2006.01)
(Continued)

(52) U.S. Cl.
CPC ......... *F16H 61/0213* (2013.01); *B60W 10/06* (2013.01); *B60W 20/30* (2013.01);
(Continued)

(58) Field of Classification Search
CPC ............. F16H 59/72; F16H 2061/0241; F16H 2061/6644; F16H 61/664; F16H 2312/20
See application file for complete search history.

(56) References Cited

U.S. PATENT DOCUMENTS 6,045,480 A * 4/2000 Sakai ...................... F16H 15/38
192/3.3
2002/0173403 A1   11/2002 Kohno et al.
(Continued)

FOREIGN PATENT DOCUMENTS

JP   2008-014325 A   1/2008
JP   4495117 B2   6/2010

OTHER PUBLICATIONS

International Search Report for PCT/JP2016/001221 dated Jun. 7, 2016.

*Primary Examiner* — Edwin A Young
(74) *Attorney, Agent, or Firm* — Sughrue Mion, PLLC

(57) ABSTRACT

A controller of a toroidal continuously variable transmission comprises a position control unit which outputs a driving signal to a hydraulic actuator to control a roller position. The hydraulic actuator includes a biasing mechanism which forcibly keeps the roller position at a predetermined position in a case where the driving signal meets a predetermined condition. The position control unit is configured to perform a start-up control during start-up of the toroidal continuously variable transmission. During the start-up control, the position control unit is configured to output the driving signal to reciprocate a spool of the hydraulic actuator in a case where a temperature of hydraulic oil supplied to the hydraulic actuator is lower than a reference temperature, and output the driving signal which meets the predetermined condition in a case where the temperature of the hydraulic oil has become equal to or higher than the reference temperature thereafter.

16 Claims, 16 Drawing Sheets

(51) Int. Cl.
*F16H 15/38* (2006.01)
*B60W 10/06* (2006.01)
*B60W 20/30* (2016.01)
*F16H 61/664* (2006.01)

(52) U.S. Cl.
CPC ......... *F16H 15/38* (2013.01); *F16H 61/0267* (2013.01); *F16H 61/6646* (2013.01); *F16H 2061/0218* (2013.01); *F16H 2061/6641* (2013.01)

(56) References Cited

U.S. PATENT DOCUMENTS

2002/0189320 A1* 12/2002 Otaki .................... G01N 19/02
73/9
2004/0116240 A1* 6/2004 Taketsuna ........... F16H 61/6649
476/41

* cited by examiner

CONTROLLER OF TOROIDAL CONTINUOUSLY VARIABLE TRANSMISSION

CROSS REFERENCE TO RELATED APPLICATIONS

This application is a National Stage of International Application No. PCT/JP2016/001221 filed Mar. 7, 2016.

TECHNICAL FIELD

The present invention relates to a controller of a toroidal continuously variable transmission (toroidal CVT).

BACKGROUND ART

In a toroidal continuously variable transmission (toroidal CVT), oil is used for multiple purposes, for example, hydraulically actuating a hydraulic mechanism which displaces power rollers. If the mobility of the oil is insufficient, a response delay occurs in the hydraulic mechanism. To avoid this, Patent Literature 1 discloses that a start-up control is performed at low-temperature start-up in such a way that a spool of the hydraulic mechanism is reciprocated to accelerate increasing an oil temperature, and a normal control is initiated after the oil temperature has reached a reference temperature. In the normal control, an operation command is provided to the hydraulic mechanism by a closed-loop control so that a transmission ratio (transmission gear ratio) becomes close to a command value.

CITATION LIST

Patent Literature

Patent Literature 1: Japanese Patent No. 4495117

SUMMARY OF INVENTION

Technical Problem

At a time point when the oil temperature has reached the reference temperature and the normal control is initiated, actual roller positions may be deviated from roller positions corresponding to the operation command provided to the hydraulic mechanism, due to, for example, the response delay. It is difficult to correctly know the state of a hydraulic actuator and the states of the power rollers. Therefore, control accuracy for the transmission ratio in the normal control may be affected.

Accordingly, an object of the present invention is to improve control accuracy of a transmission ratio (transmission gear ratio).

Solution to Problem

According to an aspect of the present invention, a controller of a toroidal continuously variable transmission in which a transmission ratio (transmission gear ratio) is continuously changed depending on a roller position of a power roller, comprises a hydraulic actuator which changes the roller position; and a position control unit which outputs a driving signal to the hydraulic actuator to control the roller position, wherein the hydraulic actuator includes a biasing mechanism which forcibly keeps the roller position at a predetermined position in a case where the driving signal meets a predetermined condition, wherein the position control unit is configured to perform a start-up control during start-up of the toroidal continuously variable transmission, and wherein during the start-up control, the position control unit is configured to output the driving signal to reciprocate a spool of the hydraulic actuator in a case where a temperature of hydraulic oil supplied to the hydraulic actuator is lower than a reference temperature, and output the driving signal which meets the predetermined condition to keep the roller position at the predetermined position in a case where the temperature of the hydraulic oil has become equal to or higher than the reference temperature thereafter.

In accordance with this configuration, when the temperature of the hydraulic oil has reached the reference temperature and the reciprocating motion of the spool is stopped, the roller position is kept at the predetermined position by the action of the biasing mechanism. Since there is a standby (waiting) time until the hydraulic actuator and the power roller are stabilized in predetermined states, a control performed thereafter is stabilized.

The controller of the toroidal continuously variable transmission may further comprise: a position estimation unit which estimates the roller position based on an output value of the driving signal, wherein during start-up of the toroidal continuously variable transmission, the position control unit may be configured to perform the start-up control before the position control unit performs a normal control in which an output value of the driving signal is derived based on a deviation between a command value of the roller position and an estimated value of the roller position which is estimated by the position estimation unit, and wherein the position estimation unit may be configured to set the predetermined position to an initial value of the estimated value, when the start-up control is terminated and the normal control is initiated.

In accordance with this configuration, in a case where the transmission ratio is controlled under a closed-loop control based on the roller position estimated by the position estimation unit in the normal control, the roller position is kept at the predetermined position by the action of the biasing mechanism after the reciprocating motion of the spool is stopped, and the predetermined position is set to the initial value of the estimated value, control accuracy just after initiation of the normal control can be improved.

During the start-up control, the position control unit may be configured to continue to output the driving signal which meets the predetermined condition until a standby time required for the spool to reach the predetermined position passes, in a case where the temperature of the hydraulic oil has become equal to or higher than the reference temperature after the position control unit output the driving signal to reciprocate the spool of the hydraulic actuator.

In accordance with this configuration, since the roller position surely reaches the predetermined position before the normal control is initiated, control accuracy just after the initiation of the normal control can be improved.

During the start-up control, the position control unit may be configured to continue to output the driving signal which meets the predetermined condition until the temperature of the hydraulic oil becomes equal to or higher than a second reference temperature higher than the reference temperature, in a case where the temperature of the hydraulic oil has become equal to or higher than the reference temperature after the position control unit output the driving signal to reciprocate the spool of the hydraulic actuator.

In accordance with this configuration, since the temperature of the hydraulic oil is increased up to the second reference temperature before the normal control is initiated, the mobility of the oil just after the initiation of the normal control can be improved. As a result, control accuracy can be improved.

During the start-up control, the position control unit may be configured to output a pulse signal as the driving signal in a case where the temperature of the hydraulic oil supplied to the hydraulic actuator is lower than the reference temperature, and to set a wave height of the pulse signal to a larger value as the temperature of the hydraulic oil is lower.

In accordance with this configuration, the movement amount of the spool is increased to accelerate increasing the temperature of the hydraulic oil in a case where the temperature of the hydraulic oil is low, while the movement amount of the spool is reduced so that the states of the hydraulic mechanism and the power roller can be stabilized in a case where the temperature of the hydraulic oil is high.

The predetermined condition may be a condition in which an output value of the driving signal is a zero value or a negative value, and the biasing mechanism may be a safety mechanism which forcibly returns the roller position to a lower limit point in a case where the driving signal meets the predetermined condition.

Advantageous Effects of Invention

In accordance with the present application, control accuracy of a transmission ratio (transmission gear ratio) can be improved.

DESCRIPTION OF EMBODIMENTS

Hereinafter, the embodiments will be described with reference to the drawings. Throughout the drawings, the same or corresponding constituents are designated by the same reference symbols and will not be described in detail repeatedly.

Embodiment 1

Figure 1:
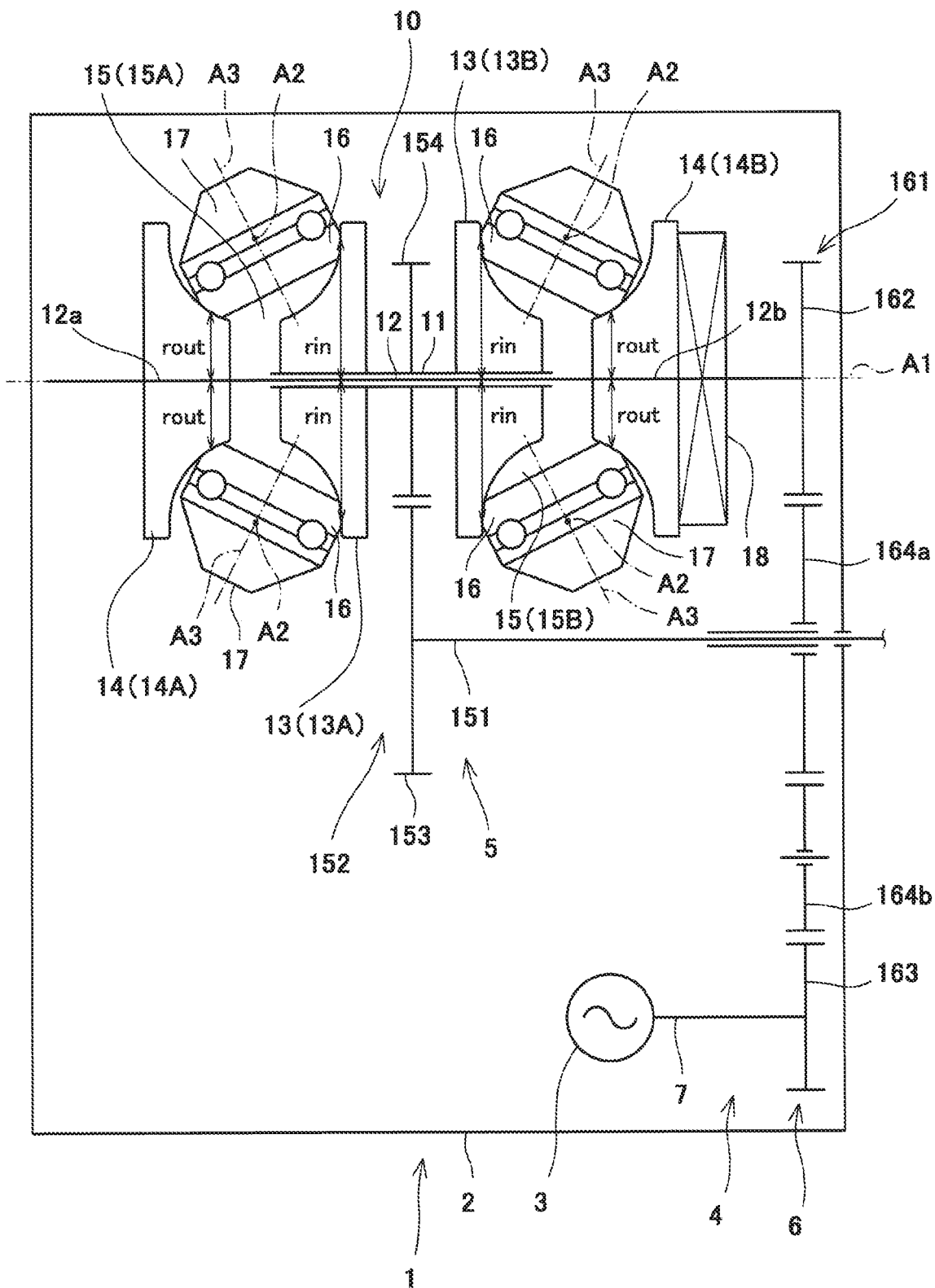
FIG. 1 is a skeleton diagram of an integrated drive generator (IDG) according to Embodiment 1.

Referring to FIG. 1, an integrated drive generator (hereinafter will be referred to as "IDG") 1 is used as an AC power supply for an aircraft. The IDG 1 includes a casing 2 mounted on an engine of the aircraft. The casing 2 accommodates therein an electric generator (power generator) 3, and a constant speed drive (hereinafter will be referred to as "CSD") 4. The CSD 4 constitutes a driving power transmission path which transmits rotational driving power of an engine rotary shaft (not shown) to the electric generator 3, and a toroidal continuously variable transmission (hereinafter will be referred to as "toroidal CVT") 10 constitutes a part of the driving power transmission path. The rotational driving power of the engine rotary shaft is input to the toroidal CVT 10 via an input path 5 of the CSD 4. The toroidal CVT 10 changes the rotational driving power and outputs the changed rotational driving power to a generator shaft 7 via an output path 6 of the CSD 4. When the generator shaft 7 rotates, the electric generator 3 generates AC power with a frequency which is proportional to a rotation speed of the generator shaft 7. A transmission ratio (transmission gear ratio) SR of the toroidal CVT 10 is continuously changed so that the rotation speed of the generator shaft 7 is kept at a proper value (value corresponding to a frequency with which electric components within the aircraft can operate stably), irrespective of a change (fluctuation) in the rotation speed of the engine rotary shaft. In this way, the frequency of the AC power generated by the electric generator 3 is kept at a proper value, and the electric components within the aircraft can stably operate.

In the toroidal CVT 10, a CVT input shaft 11 and a CVT output shaft 12 are placed coaxially on a CVT axis line A1. Input discs 13 are provided on the CVT input shaft 11 and are rotatable together with the CVT input shaft 11. Output discs 14 are provided on the CVT output shaft 12 and are rotatable together with the CVT output shaft 12. Each of the input discs 13 and the corresponding one of the output discs 14 face each other and form one annular cavity 15. The toroidal CVT 10 has a double cavity configuration. The toroidal CVT 10 includes two sets of input discs 13A, 13B and output discs 14A, 14B (each of the two sets includes the input disc and the output disc and the two sets have the same structure). Two cavities 15A, 15B are arranged in the extension direction of the CVT axis line A1. Two power rollers 16 are disposed within one cavity 15. The power rollers 16 are supported by trunnions 17, respectively in such a way that each of the power rollers 16 is rotatable around a rolling motion axis line A3. The trunnions 17 correspond to the power rollers 16, respectively, in a one-to-one correspondence. The trunnions 17 are supported by the casing 2 so that each of the trunnions 17 is displaceable in the extension direction of a tilt motion axis line A2 and is rotatable around the tilt motion axis line A2.

The power rollers 16 are supplied with traction oil, and pushed against the discs 13, 14 by a clamping force generated by a clamping mechanism 18. The clamping mechanism 18 may be a cam-driven mechanism (sometimes referred to as a loading cam mechanism) or a hydraulic mechanism. This allows an oil film (membrane) with a high viscosity to be formed in input side contact regions (regions where the power rollers 16 contact the input discs 13) and in output side contact regions (regions where the power rollers 16 contact the output discs 14). The CVT input shaft 11 is driven to rotate by the rotational driving power input from the input path 5. With the rotation of the CVT input shaft 11, the input discs 13 rotate together with the CVT input shaft 11 and the power rollers 16 are driven to rotate around the rolling motion axis lines A3 by a shear resistance of the oil film which is generated in the input side contact regions. With the rotation of the power rollers 16 around the rolling motion axis lines A3, the output discs 14 are driven to rotate by a shearing resistance of the oil film which is generated on the output side contact regions, and the CVT output shaft 12 rotates together with the output discs 14. The rotational driving power of the CVT output shaft 12 is output to the output path 6.

A transmission ratio (transmission gear ratio) SR is continuously changed depending on the roller positions X (positions in the extension direction of the tilt motion axis lines A2 of the power rollers 16). In the description, the transmission ratio SR is defined as a ratio of an output rotation speed (rotation speed of the CVT output shaft 12) N2 of the toroidal CVT 10 with respect to an input rotation speed (rotation speed of the CVT input shaft 11) N1 of the toroidal CVT 10 and is equal to a radius ratio (SR=N2/N1=rin/rout). The radius ratio is defined as a ratio of an input side contact region radius rin (distance from the CVT axis line A1 to each of the input side contact regions) with respect to an output side contact region radius rout (distance from the CVT axis line A1 to each of the output side contact regions). With the change in the roller positions X, the power rollers 16 rotate around the tilt motion axis lines A2 until a side slip is ceased, and tilt motion angles φ (rotation angles of the power rollers 16 around the tilt motion axis lines A2) are changed. With the change in the tilt motion angles φ, the input side contact regions and the output side contact regions are displaced, and hence the input side contact region radiuses rin and the output side contact region radiuses rout are continuously changed. Therefore, the radius ratio, namely, the transmission ratio SR, is continuously changed.

Figure 2:
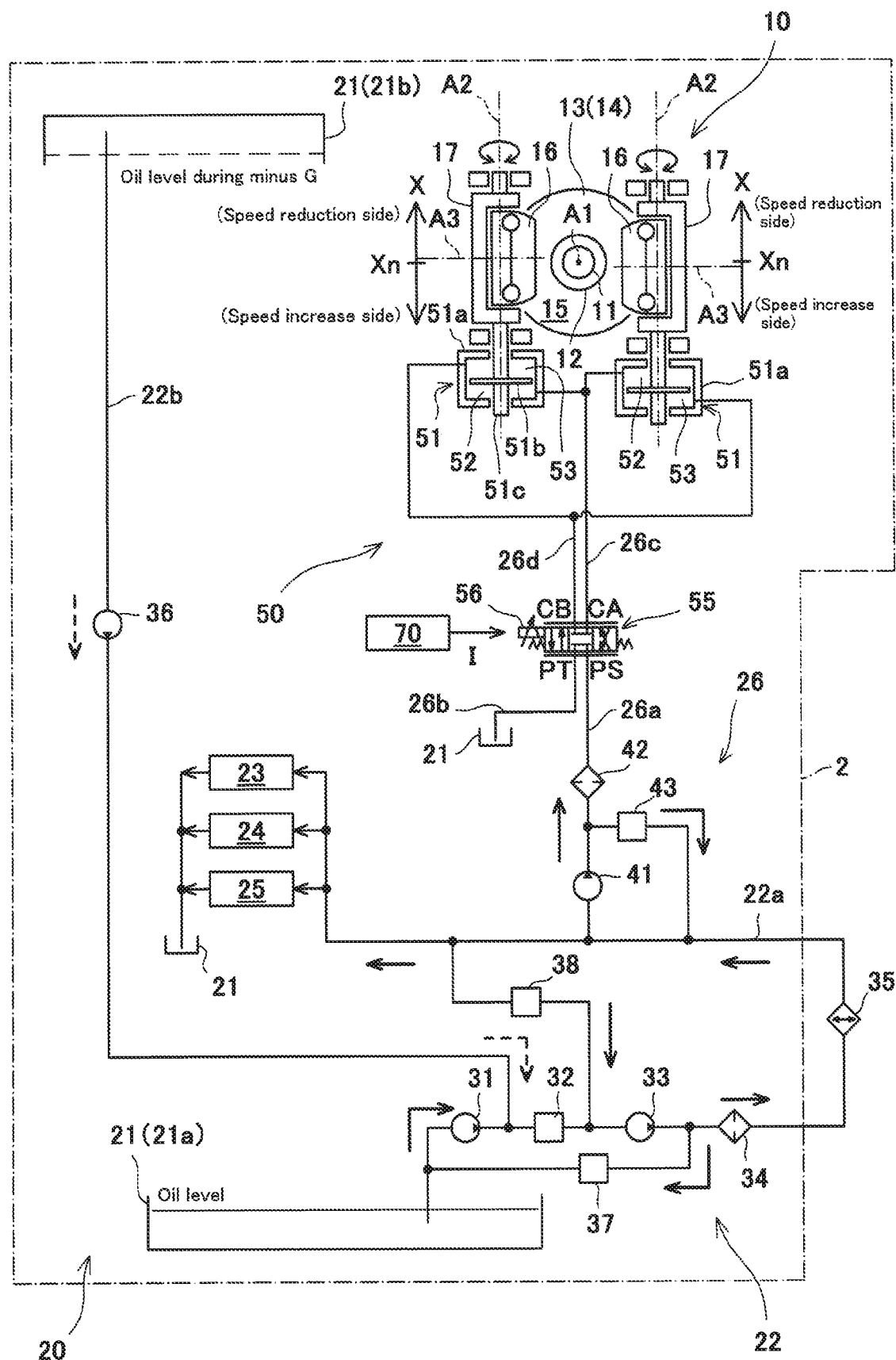
FIG. 2 is a hydraulic circuit diagram of the IDG of FIG. 1.

As shown in FIG. 2, the roller positions X are changed by a hydraulic actuator 50. The hydraulic actuator 50 includes a plurality of hydraulic cylinders 51. The hydraulic cylinders 51 correspond to the power rollers 16 and the trunnions 17 in a one-to-one correspondence. Although FIG. 2 shows only one cavity 15, the remaining cavity which is not shown has the same configuration.

Each of the hydraulic cylinders 51 includes a body 51a, a piston 51b, and a rod 51c. The hydraulic cylinder 51 is a double-acting hydraulic cylinder. The interior of the body 51a is separated into a speed increase chamber 52 and a speed reduction chamber 53 by the piston 51b. The rod 51c is placed coaxially with the tilt motion axis line A2. The rod 51c couples the piston 51b to the trunnion 17. The rod 51c is movable in the extension direction of the tilt motion axis line A2, together with the trunnion 17 and the power roller 16 supported by the trunnion 17.

When the oil is supplied to the speed increase chamber 52 and discharged from the speed reduction chamber 53, the roller position X is changed to a speed increase side which is a first side in the extension direction of the tilt motion axis line A2. When the oil flows in a direction opposite to the above flow direction, the roller position X is changed to a speed reduction side which is opposite to the speed increase side in the extension direction of the tilt motion axis line A2.

The two power rollers 16 placed within one cavity 15 keep their radius ratios at an equal value when the roller positions X are changed. Therefore, these power rollers 16 are required to be displaced in opposite directions in the extension direction of the tilt motion axis lines A2. In contrast, for the convenience of layout, the two hydraulic cylinders 51 corresponding to the two power rollers 16 are disposed on the same side in the extension direction of the tilt motion axis lines A2, with respect to the cavity 15. In that case, in one of the hydraulic cylinders 51, the speed increase chamber 52 is a rod side oil chamber and the speed reduction chamber 53 is a head side oil chamber. In the other of the hydraulic cylinders 51, the correspondence is reversed.

Figure 3:
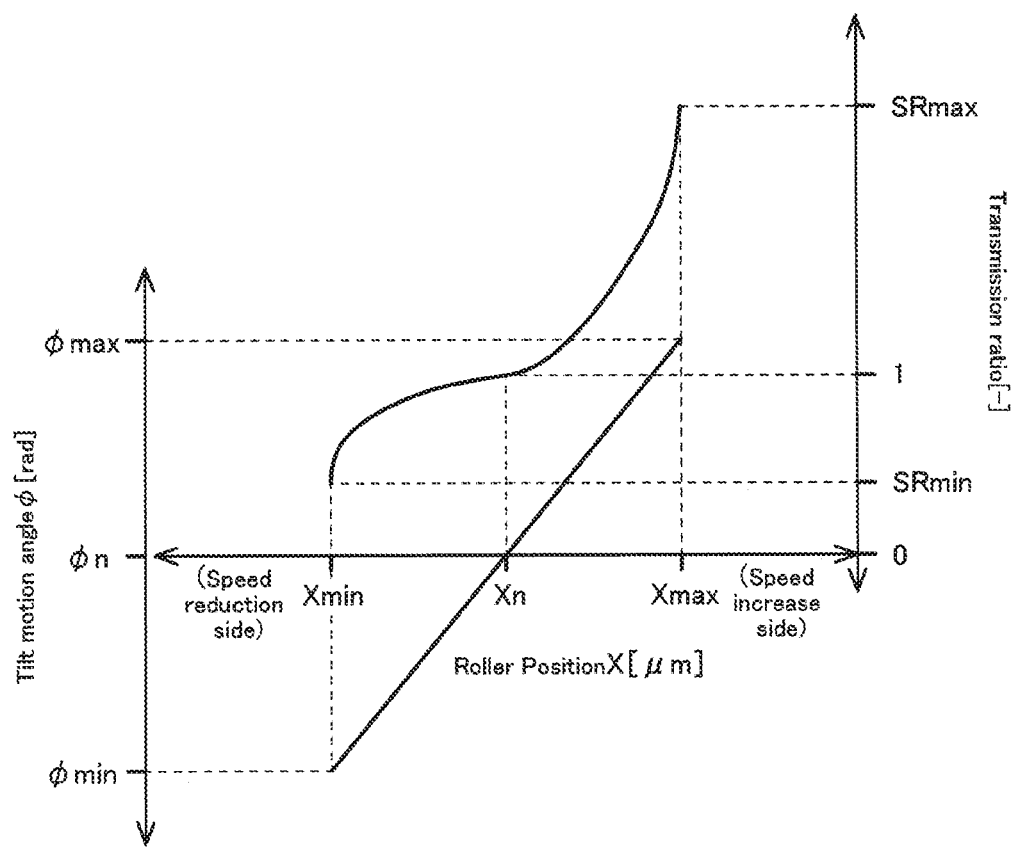
FIG. 3 is a graph showing a relation between a tilt motion angle and a transmission ratio, and a roller position, in a toroidal continuously variable transmission (toroidal CVT) of FIG. 1.

As shown in FIG. 3, when the roller position X is changed to the speed increase side, the tilt motion angle φ increases and the transmission ratio SR increases. When the roller position X is changed to the speed reduction side, the tilt motion angle φ decreases and the transmission ratio SR decreases. When the roller position X reaches an upper limit point Xmax, the tilt motion angle φ becomes a maximum tilt motion angle φmax, and the transmission ratio SR becomes a maximum transmission ratio SRmax which is larger than 1. When the roller position X reaches a lower limit point Xmin, the tilt motion angle φ becomes a minimum tilt motion angle φmin, and the transmission ratio SR becomes a minimum transmission ratio SRmin which is less than 1. A tilt motion allowable (permissible) range for the power roller 16 is mechanically determined by a stopper (not shown) provided at the trunnion 17 to prevent an excessive tilt motion. When the roller position X is at a neutral point Xn, the tilt motion angle φ becomes a neutral angle φn (see FIG. 16) and the transmission ratio SR becomes 1. The neutral angle φn is almost equal to a median value in the tilt motion allowable range and the minimum transmission ratio SRmin is almost equal to the reciprocal of the maximum transmission ratio SRmax (φn≈(φmax+φmin)/2, SRmin≈1/SRmax).

Turning back to FIG. 2, the hydraulic actuator 50 constitutes a hydraulic system 20 of the IDG1. The hydraulic system 20 includes a sump 21, a low-pressure oil supply unit 22, a traction oil supply mechanism 23, a lubricating oil supply mechanism 24, a cooling oil supply mechanism 25, and a high-pressure oil supply unit 26. The sump 21 includes a first sump 21a and a second sump 21b which are placed inside the casing 2. The first sump 21a reserves the oil during a normal state (during plus G). The second sump 21b reserves the oil during minus G. The low-pressure oil supply unit 22 supplies the oil in a deaeration state, from the sump 21 to the traction oil supply mechanism 23, the lubricating oil supply mechanism 24, the cooling oil supply mechanism 25, and the high-pressure oil supply unit 26, irrespective of whether a gravity acceleration rate of the casing 2 is positive or negative. The traction oil supply mechanism 23 supplies the oil from the low-pressure oil supply unit 22 to the surfaces of the power rollers 16 as traction oil. The lubricating oil supply mechanism 24 supplies the oil from the low-pressure oil supply unit 22 to gears and bearings of the CSD 4 as lubricating oil. The cooling oil supply mechanism 25 supplies the oil from the low-pressure oil supply unit 22 to the electric generator 3 as cooling oil. The high-pressure oil supply unit 26 increases the pressure of the oil supplied in the deaeration state from the low-pressure oil supply unit 22 and supplies higher-pressure oil (oil with an increased pressure) to a hydraulic mechanism (e.g., hydraulic actuator 50) which requires the oil with a pressure higher than that of the oil supplied to other parts (e.g., the surfaces of the power rollers 16, the gears, the bearings).

In the low-pressure oil supply unit 22, a scavenging pump 31, a deaerator 32, a low-pressure pump (lubrication pump) 33, a filter 34, and an oil cooler 35 are provided at an oil passage 22a which opens in the first sump 21a, and arranged in this order from the first sump 21a. An inversion pump 36 is provided at an oil passage 22b which opens in the second sump 21b. The oil passage 22b is connected to the oil passage 22a at a location that is upstream of the deaerator 32. The oil passage 22a is connected to the mechanisms 23 to 25 and the unit 26, at locations that are downstream of the oil cooler 35. In the high-pressure oil supply unit 26, a high-pressure pump 41 and a filter 42 are provided at a supply line 26a which branches from the oil passage 22a and arranged in this order. The supply line 26a is connected to the hydraulic actuator 50. In a case where the clamping mechanism 18 (see FIG. 1) is a hydraulic (hydraulically powered) mechanism, the supply line 26a may be connected to the clamping mechanism 18. The pumps 31, 33, 36, and 41 are driven by rotational driving power (which originates in the rotational driving power of the engine rotary shaft) which is taken out of the output path 6 (see FIG. 1) of the CSD 4.

During the plus G (including the activation of the IDG1 and the toroidal CVT 10), the scavenging pump 31 supplies the oil from the first sump 21a to the deaerator 32. During the minus G, the inversion pump 36 supplies the oil from the second sump 21b to the deaerator 32. The low-pressure pump 33 suctions the oil having been deaerated by the deaerator 32 and discharges the oil. A pressure adjustment valve 37 adjusts the pressure of the oil discharged by the low-pressure pump 33. The filter 34 cleans this oil. Then, the oil cooler 35 cools this oil. Then, a pressure adjustment valve 38 adjusts the pressure of this oil. The oil whose pressure has been adjusted by the pressure adjustment valve 38 is supplied to the mechanisms 23 to 25 and the unit 26 through the oil passage 22a. The high-pressure pump 41 suctions the oil from the low-pressure oil supply unit 22 and discharges the hydraulic oil to the supply line 26a. The filter 42 cleans the oil discharged from the high-pressure pump 41. Then, a pressure adjustment valve 43 adjusts the pressure of this oil. After the oil has passed through the pressure adjustment valve 43, the oil is returned to the low-pressure oil supply unit 22 (to be precise, a region of the oil passage 22a, which is downstream of the oil cooler 35, in other words, a suction port of the high-pressure pump 41). The oil whose pressure has been adjusted by the pressure adjustment valve 43 has a pressure higher than that in the oil passage 22a, and is supplied to the hydraulic actuator 50.

The hydraulic actuator 50 further includes a control valve 55. Although the hydraulic cylinders 51 correspond to the power rollers 16, respectively, in a one-to-one correspondence, the control valve 55 is, for example, a single valve.

The control valve 55 is a four-direction selector valve, and includes a supply port PS, a return port PT, a speed increase control port CA and a speed reduction control port CB. The supply line 26a is connected to the supply port PS. A drain 26b is connected to the return port PT. All speed increase chambers 52 (including speed increase chambers of the hydraulic cylinders corresponding to the cavity which is not shown) are connected to the speed increase control port CA via a speed increase oil passage 26c. All speed reduction chambers 53 (including speed reduction chambers of the hydraulic cylinders corresponding to the cavity which is not shown) are connected to the speed reduction control port CB via a speed reduction oil passage 26d. The control valve 55 is a spool valve. A connection state of the port changes depending on the position of the spool 55a (see FIG. 4). The control valve 55 is a three-position selector valve. The spool 55a can be located in a cut-off region (center position in FIG. 2), a speed increase region (left position in FIG. 2), or a speed reduction region (right position in FIG. 2).

Figure 5A:
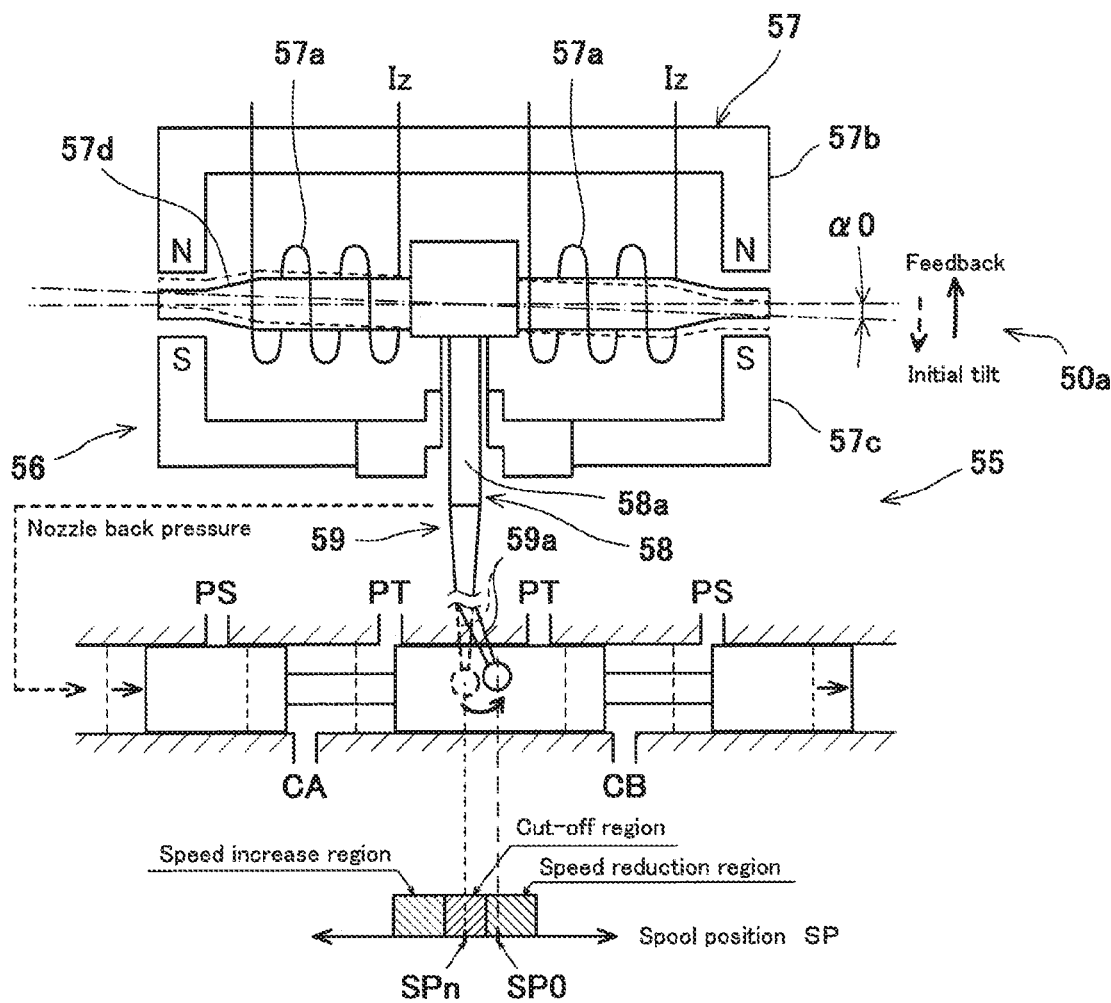
FIG. 5A is a view showing a biasing mechanism of a hydraulic actuator of FIG. 2.

In the cut-off region, the control ports CA, CB are cut-off (disconnected) from the supply port PS and the return port PT. At this time, supplying and discharging the oil to and from the two chambers 52, 53 are stopped, and the transmission ratio is maintained. In the speed increase region, the speed increase control port CA is connected to the supply port PS and the speed reduction control port CB is connected to the return port PT. At this time, the oil is supplied to the speed increase chamber 52 and discharged from the speed reduction chamber 53, and the transmission ratio is increased. In the speed reduction region, the speed increase control port CA is connected to the return port PT, and the speed reduction control port CB is connected to the supply port PS. At this time, the oil is supplied to the speed reduction chamber 53 and discharged from the speed increase chamber 52, and the transmission ratio is reduced. In a case where the spool 55a is located in the speed increase region, the opening rate of the supply port PS and the opening rate of the return port PT are variably set depending on the spool position within the speed increase region. The same applies to a case where the spool 55a is located in the speed reduction region (FIG. 5A shows a state in which the spool 55a is located in the speed reduction region and the opening rates are set to values which are less than those of fully open positions).

The control valve 55 includes a driving unit 56 which drives the spool 55a to control the spool position and the opening rates. This makes it possible to adjust the flow rates and pressures of the oil to be supplied to and discharged from the two chambers 52, 53. The control valve 55 is an electric valve. The driving unit 56 receives a driving signal as an input from a control unit 70 and controls the spool position and the opening rates, in response to an output value I (electric current value) of the driving signal.

Figure 4:
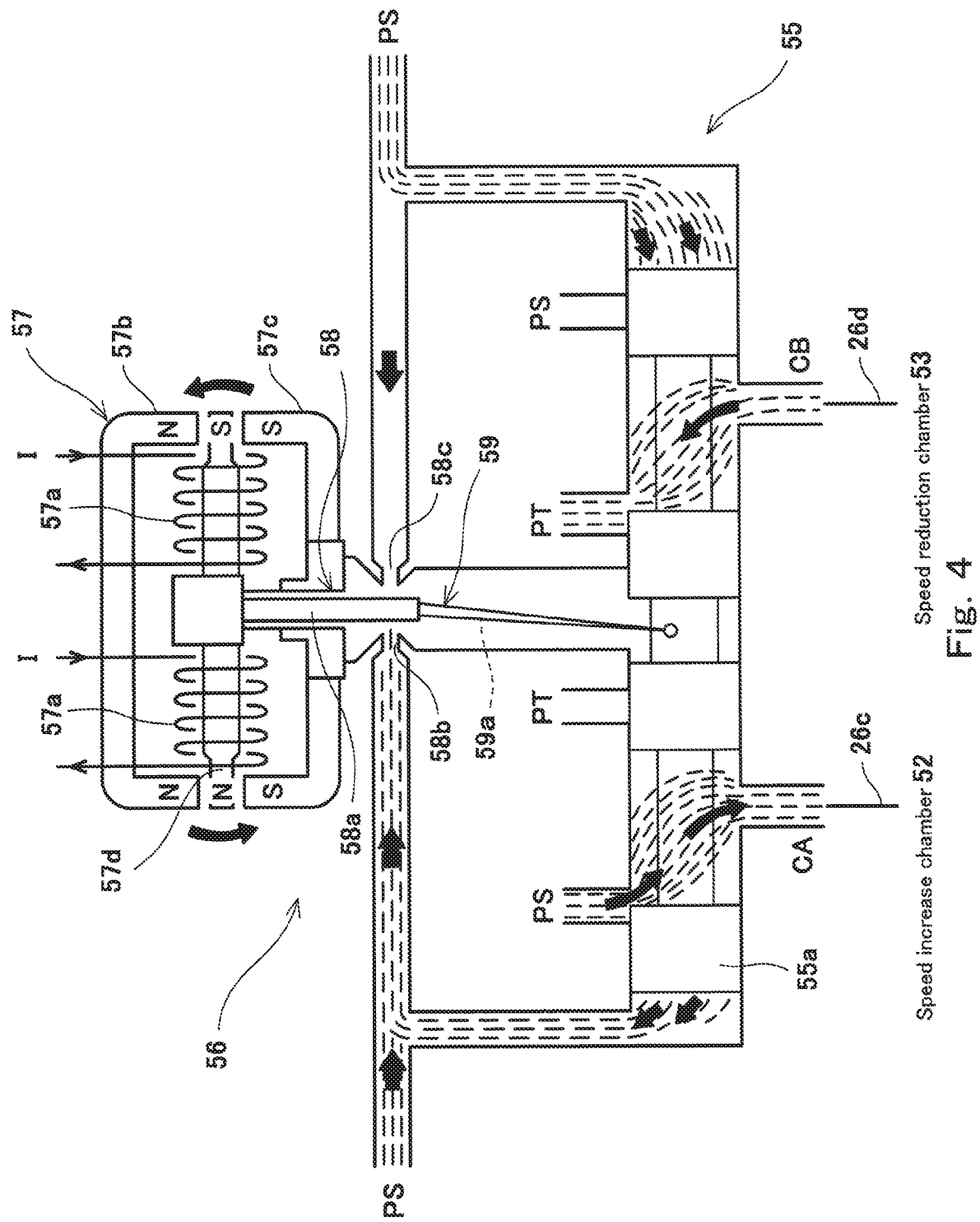
FIG. 4 is a cross-sectional view of a control valve of FIG. 2.

As shown in FIG. 4, the control valve 55 is a nozzle flapper servo valve. The driving unit 56 includes a motor section 57 which receives the driving signal as an input and generates torque, a nozzle flapper section 58 which displaces the spool 55a in response to the torque generated by the motor section 57, and a feedback section 59 which operates the motor section 57 and the nozzle flapper section 58 in response to the displacement of the spool 55a.

In the motor section 57, when the driving signal is input to the coils 57a, the torque corresponding to the polarity and magnitude of the driving signal is generated in an armature 57d, based on a magnetic force working between upper and lower magnetic poles 57b, 57c and the armature 57d. This causes the armature 57d to be tilted (inclined) with respect to the upper and lower magnetic poles 57b, 57c. In the nozzle flapper section 58, a flapper 58a integrated with the armature 57d is displaced as the armature 57d is tilted. With this displacement, an orifice aperture (opening) amount between the flapper 58a and a left nozzle 58b and an orifice aperture amount between the flapper 58a and a right nozzle 58c are changed, and a balance of a nozzle back pressure is lost (the nozzle back pressure in a region to which the flapper 58a approaches is increased, and the nozzle back pressure in a region from which the flapper 58a is away is decreased. The left nozzle back pressure and the right nozzle back pressure are applied to the both end surfaces of the spool 55a. With occurrence of the imbalance of the nozzle back pressure, the spool 55a starts to be displaced. The feedback section 59 includes, for example, a spring 59a supported by the spool 55a and the armature 57d. When the spool 55a is displaced, the torque which is the reverse of the torque based on the magnetic force is generated in the spring 59a, and the flapper 58a and the armature 57d are returned to the neutral position by this torque. As a result, the balance of the nozzle back pressure can be obtained, and the spool 55a is stopped. Based on the above-described principle, the spool position and the opening rates corresponding to the magnetic pole and magnitude of the driving signal can be obtained.

As shown in FIG. 5A, the hydraulic actuator 50 includes a biasing mechanism 50a which forcibly keeps the roller position X at a predetermined position, in a case where the driving signal meets a predetermined condition. For example, the biasing mechanism 50a may be a safety mechanism which forcibly returns the roller position X to the lower limit point Xmin and keeps the transmission ratio SR at the minimum transmission ratio SRmin which is safe, in a case where a condition in which the output value I is zero value Iz is met. In a case where a power supply for the control unit 70 is off, a driving current input to the driving unit 56 becomes the zero value Iz. Therefore, the function of the safety mechanism can be obtained. Note that the biasing mechanism 50a also forcibly returns the roller position X to the lower limit point Xmin in a case where a condition in which the output value I is a negative value is met.

The safety mechanism is realized by mechanically providing the armature 57d with a specified initial tilt α0 with respect to the neutral position. In a case where the output value I is the zero value Iz, a differential pressure corresponding to the initial tilt α0 occurs between the right and left nozzle back pressures. This causes the spool 55a to be located at a bias position SP0 within the speed reduction region rather than the neutral position SPn within the cut-off region. In FIG. 5A, broken lines indicate a state which is before the spool 55a starts to be displaced by the differential pressure corresponding to the initial tilt α0 and the spring 59a feeds back the torque (the spool 55a does not start to be displaced yet and the spring 59a does not feedback the torque yet). In FIG. 5A, solid lines indicate a state in which the flapper 58a and the armature 57d are returned to the neutral position to cancel the initial tilt α0 by the action of the feedback section 59, and the spool 55a is displaced to the bias position SP0 and stopped there. Although in the example of FIG. 5A, the opening rates of the supply port PS and the return port PT are set to values less than those of the fully open positions in a state in which the spool position SP is the bias position SP0, this is exemplary, and the opening rates may be equal to those of the fully open positions. The safety mechanism includes a tilt adjustment mechanism (not shown) which adjusts the initial tilt α0.

In a case where the output value I is the zero value Iz and the spool 55a continues to stay at the bias position SP0, the roller position X, the tilt motion angle φ, and the transmission ratio SR reach the lower limit point Xmin, the minimum tilt motion angle φmin, and the minimum transmission ratio SRmin, respectively, and are kept at these values. On the other hand, to locate the spool 55a at the neutral position SPn within the cut-off region and keep the roller position X, it is necessary to set the output value I of the driving signal so that the torque required to cancel the initial tilt α0 is generated in the armature 57d and to continue to provide the driving signal to the coils 57a. Hereinafter, the output value I used to obtain the neutral position SPn will be referred to as "neutral position value In". Although the polarity of the neutral position value In is plus, this polarity may be minus.

Figure 5B:
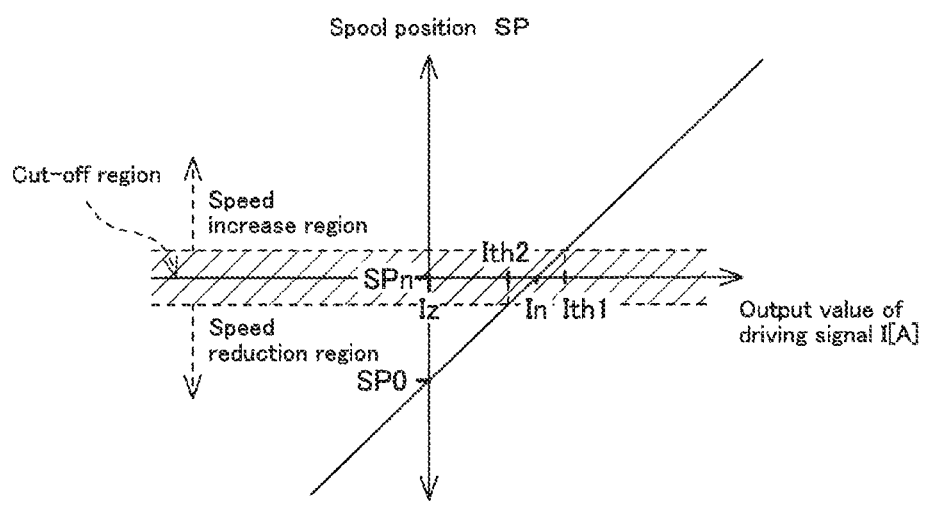
FIG. 5B is a graph showing a relation between a spool position of a control valve of FIG. 2 and a driving signal output value.

As shown in FIG. 5B, in a case where the output value I is larger than a first threshold Ith1, the spool position SP is located in the speed increase region and the opening rates which are proportional to the magnitude of the output value I can be obtained. In a case where the output value I is smaller than a second threshold Ith2 and is larger than the zero value Iz (the driving signal has the plus polarity), the spool position SP is located in the speed reduction region and the opening rates which are proportional to the magnitude of the output value I can be obtained. The first threshold Ith1 is defined as the output value I corresponding to criticality between the speed increase region and the cut-off region. The second threshold Ith2 is defined as the output value I corresponding to criticality between the speed reduction region and the cut-off region.

Figure 6:
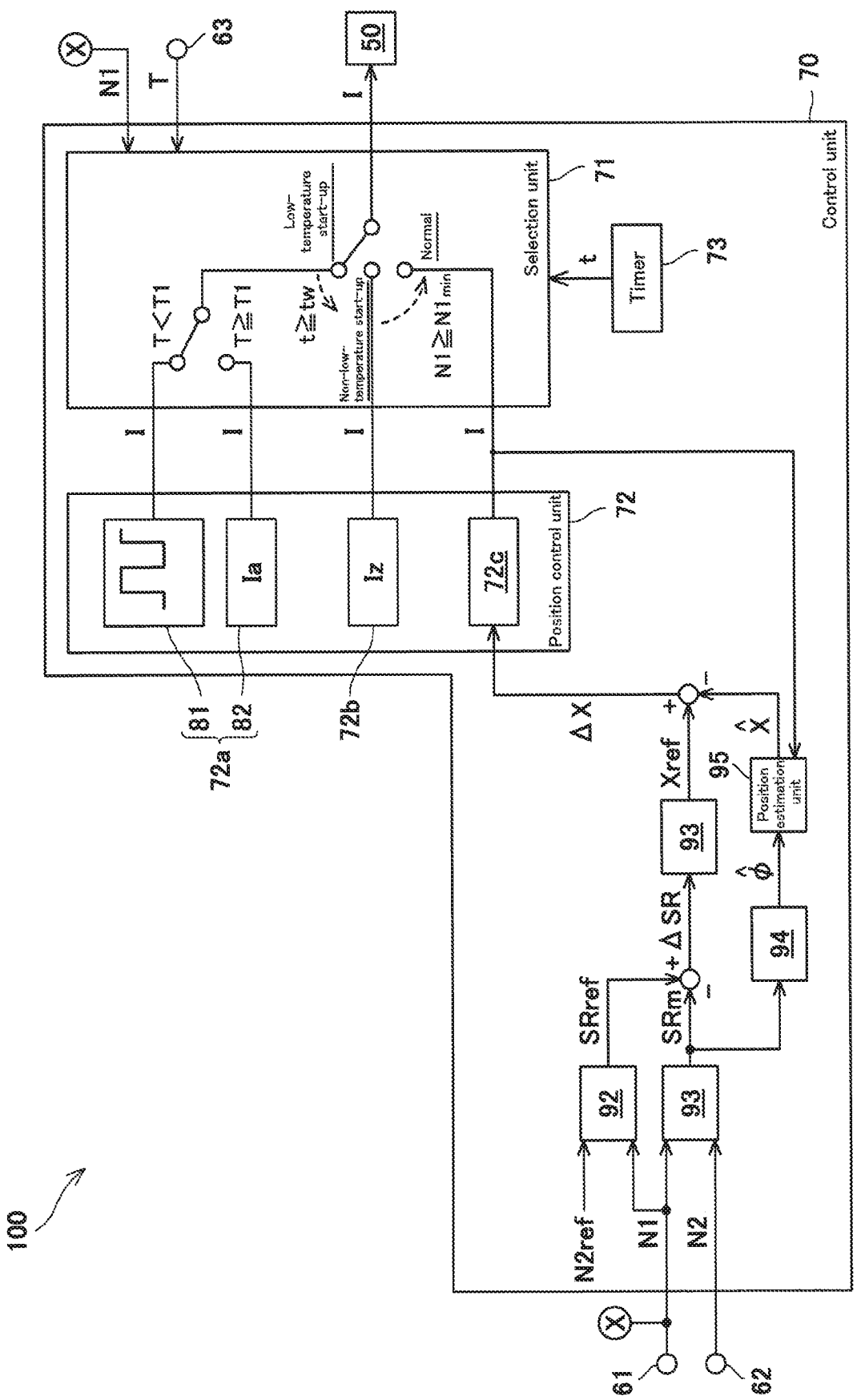
FIG. 6 is a block diagram of a controller according to Embodiment 1.

FIG. 6 is a block diagram of a controller 100 according to Embodiment 1. An engine mounted in an aircraft is activated during parking. In the meantime, the IDG1 is also activated. Specifically, the rotational driving power of the engine rotary shaft is transmitted to the CSD 4, the toroidal CVT 10 is activated to start to transmit the driving power by the traction drive, the electric generator 3 and the pumps 31, 33, 36, and 41 are activated, and the hydraulic actuator 50 is ready to be actuated. The electric components inside the aircraft are driven by electric power supplies (e.g., external electric generator or auxiliary electric generator) different from the IDG1 until the IDG1 becomes able to stably operate. At a time point when the IDG1 has become able to stably operate, the electric power supply for the electric components is shifted from the electric power supplies different from the IDG1 to the IDG1. During running of the engine, the IDG1 is used as a major electric power supply for the aircraft. Therefore, typically, in the aircraft in which the IDG1 is mounted, the electric power supply is shifted before the aircraft takes off. In a state in which the oil temperature is excessively low, the viscosity of the oil is excessively high, and the hydraulic actuator 50 cannot be actuated as desired. In a state in which the IDG1 is activated, the oil is naturally circulated by the operations of the pumps 31, 33, 36, and 41 so that the oil temperature can be increased and the mobility of the oil can be improved. However, the oil temperature may be increased slowly and shifting of the electric power supply may be delayed. In accordance with the controller 100, the oil temperature can be quickly raised even during low-temperature start-up. This allows the IDG1 to stably operate in a short time, and the aircraft to smoothly operate.

The controller 100 includes a plurality of sensors in addition to the hydraulic actuator 50 and the control unit 70 described above. The sensors include, for example, an input rotation speed sensor 61 which detects an input rotation speed N1 of the toroidal CVT 10, an output rotation speed sensor 62 which detects an output rotation speed N2 of the toroidal CVT 10, and an oil temperature sensor 63 which detects the temperature (hydraulic oil temperature) T of the oil to be supplied to the hydraulic actuator 50.

The control unit 70 includes a selection unit 71 and a position control unit 72. The selection unit 71 selects a mode, depending on the state or condition of the IDG1, specifically, an input rotation speed N1 and a hydraulic oil temperature T. The modes include, for example, a "start-up mode" in which a "start-up control" is performed, and a "normal mode" in which a "normal control" is performed. The start-up mode includes, for example, a "low-temperature start-up mode" in which a "low-temperature start-up control" of the start-up control is performed, and a "non-low-temperature start-up mode" in which a "non-low-temperature start-up control" of the start-up control is performed. The position control unit 72 outputs the driving signal to the hydraulic actuator 50 to control the roller position X. The position control unit 72 includes a low-temperature start-up control unit 72a which outputs the driving signal in the low-temperature start-up control, a non-low-temperature start-up control unit 72b which outputs the driving signal in the non-low-temperature start-up control, and a normal control unit 72c which outputs the driving signal in the normal control.

Figure 7:
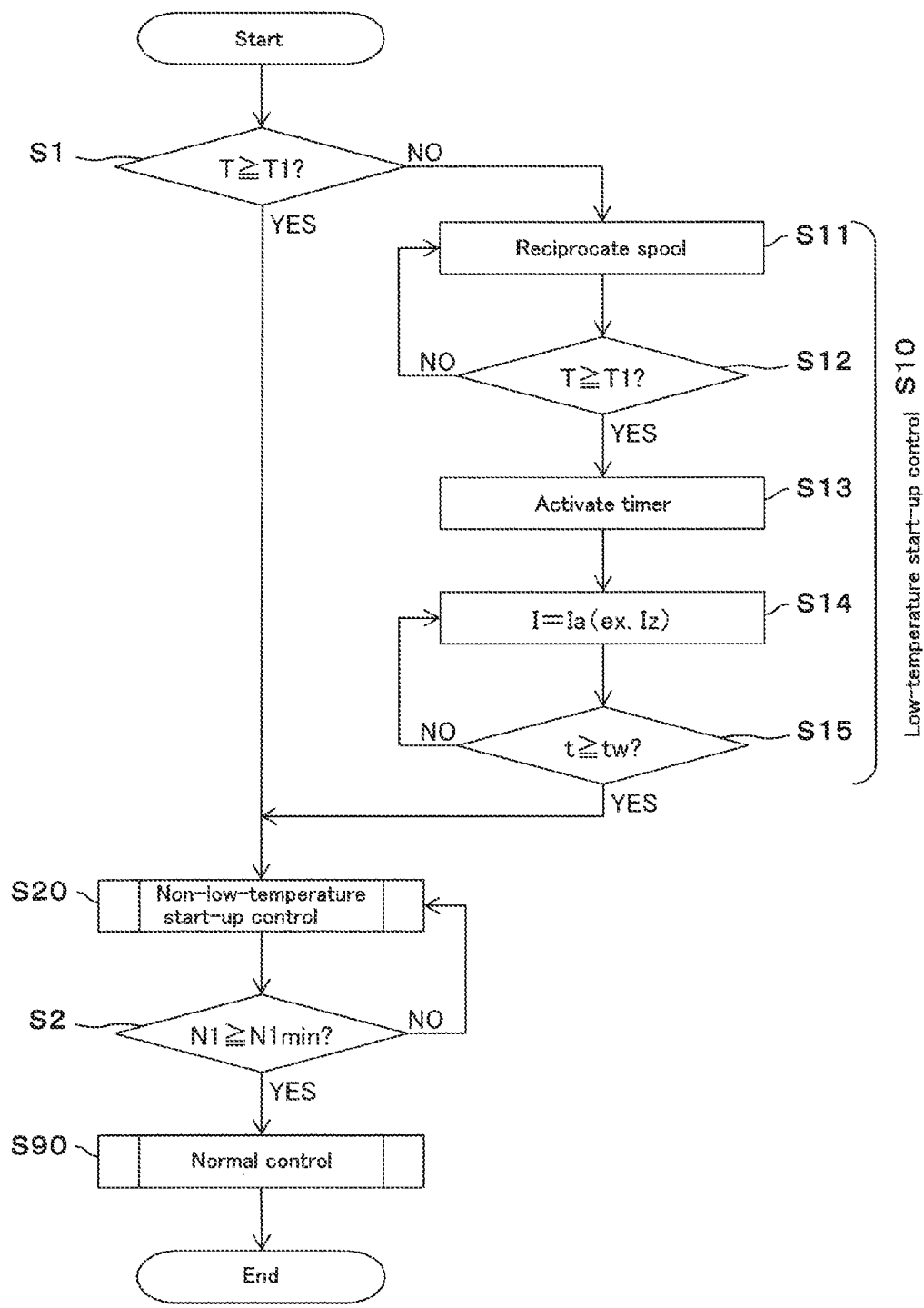
FIG. 7 is a flowchart of a control performed by the controller of FIG. 6.

With reference to FIG. 7 in addition to FIG. 6, the operation of the selection unit 71 and the normal control S90 will be described. During activation of the IDG1, the control unit 70 determines whether or not the hydraulic oil temperature T detected by the oil temperature sensor 63 is equal to or higher than a reference temperature T1 (S1). In a case where the hydraulic oil temperature T is lower than the reference temperature T1 (S1: NO), the selection unit 71 selects the low-temperature start-up mode and the low-temperature start-up control unit 72a performs the low-temperature start-up control S10. In a case where the hydraulic oil temperature T is equal to or higher than the reference temperature T1 (S1: YES) or the low-temperature start-up control unit 72a terminates the low-temperature start-up control S10, the selection unit 71 selects the non-low-temperature start-up mode and the non-low-temperature start-up control unit 72b performs the non-low-temperature start-up control S20. During the non-low-temperature start-up control S20, the control unit 70 determines whether the input rotation speed N1 detected by the input rotation speed sensor 61 is equal to or higher than a minimum value N1min (S2). In a case where the input rotation speed N1 is lower than the minimum value N1min (S2: NO), the non-low-temperature start-up control unit 72b continues the non-low-temperature start-up control S20. In a case where the input rotation speed N1 is equal to or higher than the minimum value N1min (S2: YES), the selection unit 71 selects the normal mode, and the normal control unit 72c performs the normal control S90. After shifting to the normal control S90, the electric power supply is shifted.

In step S2, the control unit 70 determines whether or not a condition used to shift the start-up control to the normal control is met. The control unit 70 is configured to perform the start-up controls S10, S20 before the control unit 70 performs the normal control S90, during activation of the IDG1 and the toroidal CVT 10.

The minimum value N1min may be, for example, a value obtained by dividing the output rotation speed N2 of the toroidal CVT 10 which is necessary for the rotation speed of the generator shaft 7 to become a proper value by the maximum transmission ratio SRmax. In a case where the input rotation speed N1 is lower than this minimum value N1min, the rotation speed of the generator shaft 7 is not increased to a proper value, and the electric generator 3 cannot stably operate, even if the transmission ratio SR is set to the maximum transmission ratio SRmax. The minimum value N1min may be, for example, a value obtained by dividing the output rotation speed N2 of the toroidal CVT 10 which is necessary for the discharge pressures of the pumps 31, 33, 36, and 41 to become equal to or higher than predetermined pressures, by the maximum transmission ratio SRmax. In a case where the input rotation speed N1 is lower than this minimum value N1min, the discharge pressures do not reach the predetermined pressures and hence the hydraulic mechanism such as the hydraulic actuator 50 cannot stably operate, even if the transmission ratio SR is set to the maximum transmission ratio SRmax. As a result, the electric generator 3 cannot stably operate. In the start-up controls S10, S20, the control unit 70 monitors the input rotation speed N1 and waits for the rotation speed of the engine rotary shaft to be increased until the input rotation speed N1 which is equal to or higher than the input rotation speed N1 is obtained.

In the normal control S90, the normal control unit 72c derives the output value I of the driving signal based on a deviation between an actual roller position and a target roller position. The normal control S90 is a closed-loop control. The controller 100 does not include a sensor which detects the tilt motion angle $\varphi$ or the roller position X. As constituents which operate during the normal control S90, the control unit 70 includes a transmission ratio measuring unit 91, a target transmission ratio calculation unit 92, a target position calculation unit 93, a tilt motion angle estimation unit 94, and a position estimation unit 95.

The transmission ratio measuring unit 91 measures the transmission ratio SR by dividing the output rotation speed N2 detected by the output rotation speed sensor 62 by the input rotation speed N1 detected by the input rotation speed sensor 61. The target transmission ratio calculation unit 92 derives a command value SRref of the transmission ratio SR by dividing a command value N2ref of the output rotation speed N2 by the input rotation speed N1 detected by the input rotation speed sensor 61. The command value N2ref of the output rotation speed N2 is a value required to make the rotation speed of the generator shaft 7 become a proper value. The command value N2ref of the output rotation speed N2 is a constant value which can be predetermined based on a target frequency of the electric generator 3, pole number of the electric generator 3, and a speed ratio of the output path 6. The target position calculation unit 93 derives the command value Xref of the roller position X based on a deviation $\Delta$SR between a command value SRref of the transmission ratio SR and a measurement value SRm of the transmission ratio SR. The tilt motion angle estimation unit 94 derives an estimated value $\hat{\varphi}$ of the tilt motion angle $\varphi$, based on the measurement value SRm of the transmission ratio SR.

The position estimation unit 95 is an observer created based on a mathematical formula model of the hydraulic actuator 50 and a mathematical formula of the tilt motion angle $\varphi$. The position estimation unit 95 derives an estimated value $\hat{X}$ of the roller position X based on the estimated value $\hat{\varphi}$ of the tilt motion angle $\varphi$ which is obtained by the tilt motion angle estimation unit 94 and the output value I of the driving signal output from the position control unit 72 (normal control unit 72c). A deviation $\Delta$X provided to the normal control unit 72c is derived based on the command value Xref of the roller position X which is obtained by the target position calculation unit 93 and the estimated value $\hat{X}$ of the roller position X which is obtained by the position estimation unit 95.

The normal control unit 72c outputs the driving signal of the output value I corresponding to the deviation $\Delta$X, and thus the roller position X becomes close to the command value Xref. Concurrently with this, the transmission ratio SR becomes close to the command value SRref, the output rotation speed N2 is maintained at the command value N2ref, and the frequency of the AC power generated by the electric generator 3 is maintained at a target frequency.

Hereinafter, the start-up controls S10, S20 will be described. As shown in FIG. 7, in the low-temperature start-up control S10, the low-temperature start-up control unit 72a outputs the driving signal to reciprocate the spool 55a (S11), and the control unit 70 determines whether or not the hydraulic oil temperature T is equal to or higher than the reference temperature T1 (S12). In a case where the hydraulic oil temperature T has not reached the reference temperature T1 (S12: NO), the low-temperature start-up control unit 72a continues to output the driving signal to reciprocate the spool 55a (S11). When the hydraulic oil temperature T has reached the reference temperature T1 (S12: YES), the low-temperature start-up control unit 72a outputs the driving signal so that the reciprocating motion of the spool 55a is stopped and the roller position X is changed and kept at the predetermined position (lower limit point Xmin), by the action of the biasing mechanism 50a (S14).

In the present embodiment, a timer 73 is activated and starts counting (S13), and determines whether or not time t that passed from a time point the reciprocating motion of the spool 55a was stopped has reached predetermined standby (waiting) time tw (S15). In a case where the time t has not reached the standby time tw (S15: NO), the low-temperature start-up control unit 72a continues to output the driving signal (S14). In a case where the time t has reached the standby time tw (S15: YES), the low-temperature start-up control unit 72a terminates the low-temperature start-up control S10.

As shown in FIG. 6, the low-temperature start-up control S10 is an open-loop control, and the output value I of the driving signal is decided without feeding back the detection value, measurement value or estimated value of the roller position X, the tilt motion angle φ, or the transmission ratio SR. The low-temperature start-up control unit 72a includes a first signal setting section 81 and a second signal setting section 82.

Figure 8:
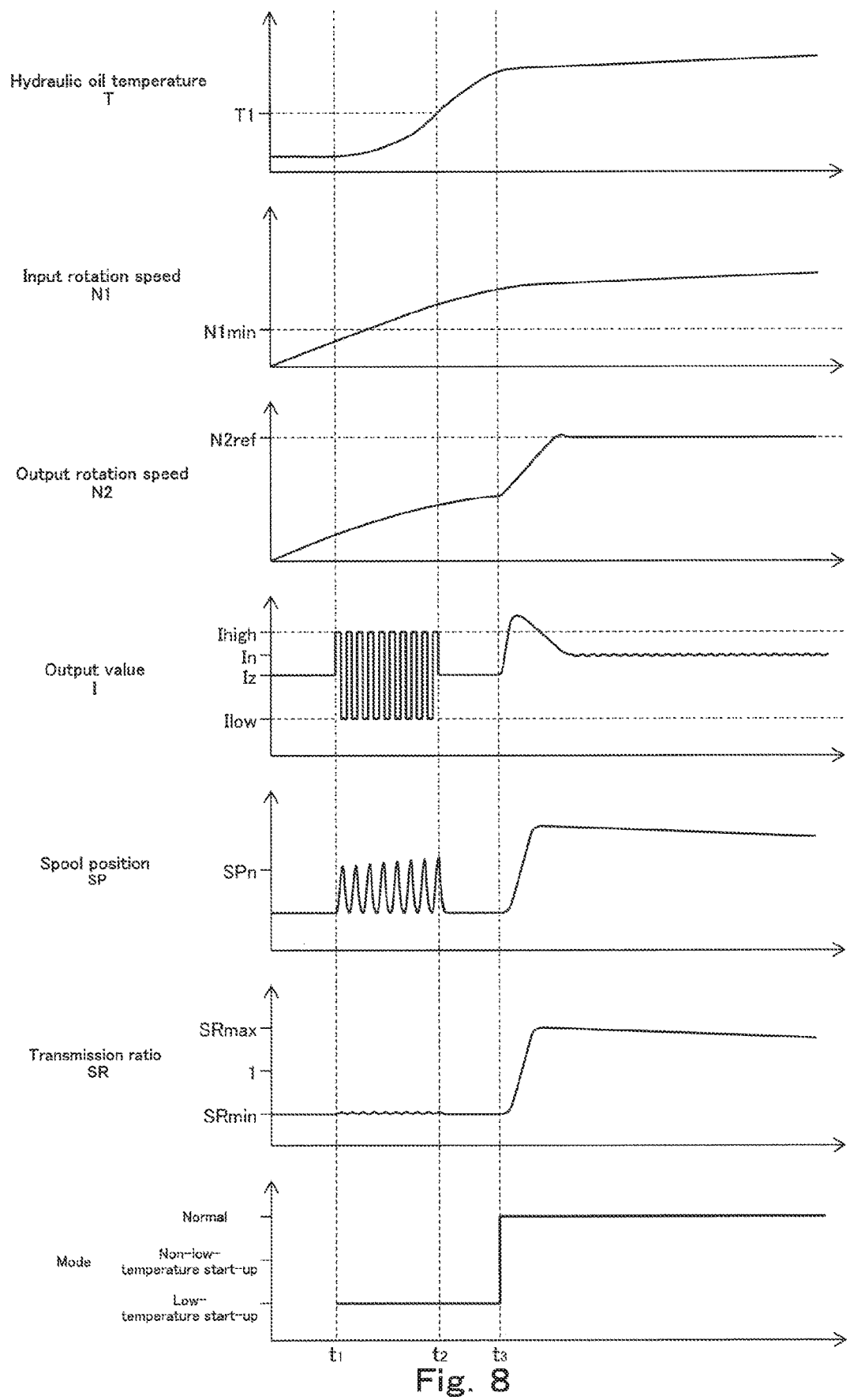
FIG. 8 is a time chart showing an example of changes over time of a hydraulic oil temperature and others, in a case where the control of FIG. 7 is performed.
Figure 9:
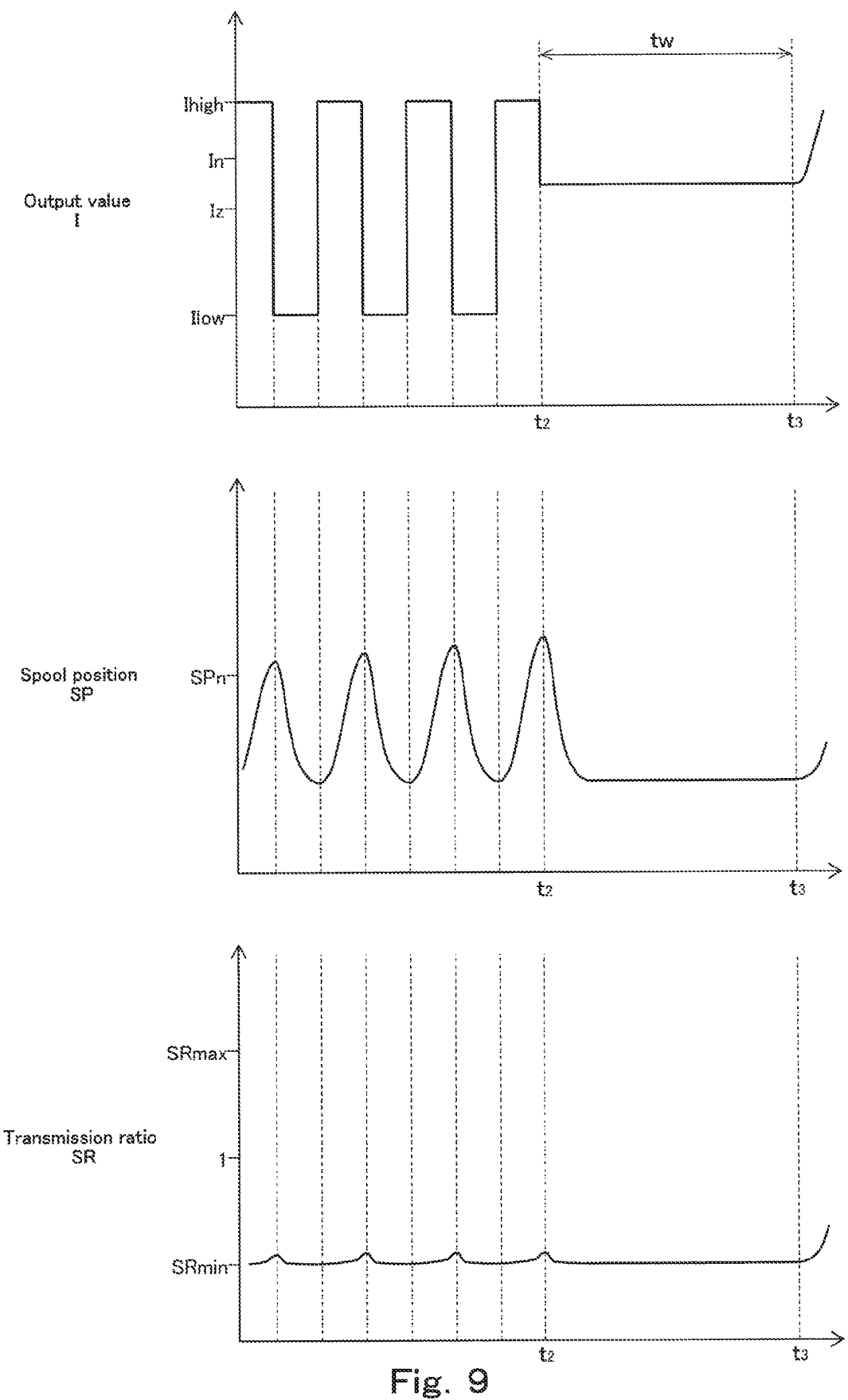
FIG. 9 is an enlarged view of FIG. 8.

In step S11, the low-temperature start-up control unit 72a outputs a pulse signal having a waveform set by the first signal setting section 81, as the driving signal, to drive the spool 55a to reciprocate it. The first signal setting section 81 sets waveform parameters (e.g., frequency, wave height, high value, low value, and duty ratio) of the driving signal. In the present embodiment, the waveform parameters are predetermined constant values. Note that rectangular waves shown in FIGS. 6, 8 and 9 are exemplary, and waveforms may be a triangular wave, a sine (sinusoidal) wave, or a saw-tooth wave.

While step S14 is performed, the low-temperature start-up control unit 72a outputs the driving signal of a biasing mechanism actuation value Ia set by the second signal setting section 82. The biasing mechanism actuation value Ia meets a condition used to forcibly change the roller position X into the lower limit point Xmin by the action of the biasing mechanism 50a. The biasing mechanism actuation value Ia is typically the zero value Iz. In that case, the spool position SP is kept at the bias position SP0 by the action of the biasing mechanism 50a. The biasing mechanism actuation value Ia may be set to a desired value smaller than the second threshold Ith2 so long as the roller position X can be kept at the predetermined position.

The non-low-temperature start-up control S20 is an open-loop control. The non-low-temperature start-up control unit 72b continues to output the driving signal of the zero value Iz to the hydraulic actuator 50. In response to this, the biasing mechanism 50a works so that the spool position SP becomes the bias position SP0. In the non-low-temperature start-up control S20, the roller position X is kept at the lower limit point Xmin and the transmission ratio SR is kept at the minimum transmission ratio to secure a situation in which undesirable over (excessive) rotation of the electric generator 3 can be avoided. In this state, the standby time passes until the input rotation speed N1 reaches the minimum value N1min.

In the low-temperature start-up control S10, the hydraulic oil temperature T is increased up to the reference temperature T1 by reciprocating the spool 55a, and the standby time tw passes after a time point when the hydraulic oil temperature T has reached the reference temperature T1. For this reason, it is assumed that the input rotation speed N1 is already equal to or higher than the minimum value N1min at a time point when the low-temperature start-up control S10 is terminated. In that case, when the low-temperature start-up control S10 is terminated, the mode shifts from the low-temperature start-up mode to the normal mode with the non-low-temperature start-up mode skipped.

When the start-up mode is terminated and the normal mode is initiated, the lower limit point Xmin is set to an initial value of the estimated value ^X of the roller position X. The deviation ΔX is derived based on the initial value of the estimated value ^X. The normal control unit 72c derives the initial value of the output value I based on the deviation ΔX.

FIG. 8 shows changes over time of the hydraulic oil temperature and others, in a case where the control of FIG. 7 is performed. FIG. 9 is an enlarged view of FIG. 8. In the example of FIG. 8, it is assumed that the hydraulic oil temperature T is lower than the reference temperature T1, at a time point t1 when the IDG1 is activated. The reference temperature T1 is, for example, −10 to 0 degrees C.

In this case, at the time point t1, the selection unit 71 selects the low-temperature start-up mode, and the position control unit 72 performs the low-temperature start-up control S10. The position control unit 72 outputs the pulse signal of the waveform parameter set by the first signal setting section 81. Receiving the pulse signal as an input, the spool 55a is reciprocated.

For example, the waveform of the pulse signal is such that a high value Ihigh is set to a value larger than the neutral position value In and a low value Ilow is set to a value smaller than the neutral position value In. In this setting, the spool 55a is located in the speed increase region while the high value Ihigh is output, and is located in the speed reduction region while the low value Ilow is output. Therefore, the oil within the two chambers 52, 53 and the oil passages 26c, 26d can be moved. The spool 55a is unable to sensitively respond to the driving signal. The spool 55a slightly moves beyond the neutral position SPn while the high value Ihigh is output. However, at that time point, the driving signal shifts to the low value Ilow. A difference between the high value Ihigh and the neutral position value In is smaller than a difference between the low value Ilow and the neutral position value In. The opening rate of the control valve 55 corresponding to the high value Ihigh is smaller than the opening rate of the control value 55 corresponding to the low value Ilow. This allows the movement speed of the roller position X to the speed reduction side to be higher than the movement speed of the roller position X to the speed increase side. In this way, while the pulse signal is output, the roller position X easily approaches the lower limit point Xmin. As a result, even in a case where the open-loop control is performed in the low-temperature start-up control S10, over (excessive) rotation of the electric generator 3 can be avoided.

Since the pulse signal is output and the spool 55a is reciprocated (the connection state of the port is changed by the reciprocating motion of the spool 55a), as described above, the oil is forcibly moved in a region that is in the vicinity of the control valve 55. This makes it possible to accelerate increasing the hydraulic oil temperature T.

While the hydraulic oil temperature T is increased to reach the reference temperature T1, the mobility of the oil is improved. For this reason, the movement speed and movement amount of the roller position X for a period in which one pulse is output are gradually increased.

At a time point t2 when the hydraulic oil temperature T has reached the reference temperature T1, the position control unit 72 outputs the driving signal of the biasing mechanism actuation value Ia (FIGS. 8 and 9 show the zero value Iz as the biasing mechanism actuation value Ia). Until the standby time tw passes from the time point t2, the output value I is fixed to the biasing mechanism actuation value Ia (zero value Iz). Thus, the roller position X is changed to the lower limit point Xmin and kept at the lower limit point Xmin. The standby time tw is time sufficient to move the roller position X to the lower limit point Xmin and can be pre-found through a test or the like. With a passage of the standby time tw, the hydraulic actuator 50 is placed motionlessly. Specifically, no electric current flows through the coils 57a, the feedback section 59 stably generates the torque required to return the initial tilt α0 to the neutral position, a pulsation of the nozzle back pressures is ceased so that the balance between the right and left nozzle back pressures is kept, the spool 55a is placed motionlessly at the bias position SP0, and the nozzle flapper section 58 and the armature 57d are placed motionlessly at the neutral position.

At a time point t3 when the standby time tw has passed from time point t2 when the hydraulic oil temperature T reached the reference temperature T1, the control unit 70 determines whether or not the input rotation speed N1 is equal to or higher than the minimum value N1min. In the present example, the input rotation speed N1 has already been equal to or higher than the minimum value N1min, before the time point t3. Therefore, the non-low-temperature start-up control S20 is skipped, and the normal control S90 is initiated. At the time point t3 when the normal control S90 is initiated, the position estimation unit 95 sets the lower limit point Xmin as the initial value of the estimated value ^X of the roller position X.

Now it is assumed that the low-temperature start-up control shifts to the normal control immediately at the time point t2 when the hydraulic oil temperature T has reached the reference temperature T1. In this case, the hydraulic actuator 50 was operating under the open-loop control before the time point t2. Therefore, it is difficult to accurately know the states at the time point when the low-temperature start-up control shifts to the normal control. Since the hydraulic oil temperature T has been increased to the reference temperature T1, the mobility of the oil has been improved, and the responsivity of the hydraulic actuator 50 to the driving signal has been improved. In a situation in which it is difficult to accurately know the states, it is difficult to adjust the roller position X by the hydraulic actuator 50 with the improved responsivity, which takes time to restore control accuracy of the transmission ratio. In particular, in a case where the control unit 70 estimates the roller positions X and the tilt motion angles φ, it is difficult to know the states of the hydraulic actuator 50 and the power rollers 16 when the normal control S is initiated. In this case, the above-described problem becomes noticeable.

In contrast, in the present embodiment, before the normal control S90 is initiated, the roller positions X are significantly changed under the open-loop control, and the standby rime tw sufficient to keep the roller positions X at the lower limit point Xmin has passed, although the controller 100 does not include the sensor which directly detects the roller positions X. Therefore, the initial values of the estimated values ^X can become accurate values in an actual situation. Before the normal control S90 is initiated, the standby rime tw sufficient to place the hydraulic actuator 50 motionlessly has passed. For this reason, the motor section 57, the noise flapper section 58, and the feedback section 59 can stably operate just after the normal control S90 is initiated. Further, at the time point t3 when the normal control S90 is initiated, the hydraulic oil temperature T has been naturally increased to exceed the reference temperature T1, because the standby rime tw has passed. For this reason, the mobility of the oil has been further improved, the responsivity of the operation of the control valve 55 to the driving signal, and the responsivity of the operation of the hydraulic actuator 50 and the responsivities of the roller positions X have been improved.

As described above, the normal control S90 can be initiated in a situation in which the mobility of the oil has been surely improved, the state of the hydraulic actuator 50 has been surely stabilized, and the power rollers 16 are surely kept at the predetermined positions. As a result, the control accuracy of the transmission ratio SR just after the normal control S90 is initiated is high and the output rotation speed N2 can quickly become close to the command value N2ref.

Embodiment 2

Regarding a controller 200 according to Embodiment 2, differences from the controller 100 according to Embodiment 1 will be described with reference to FIGS. 10 to 12.

Figure 10:
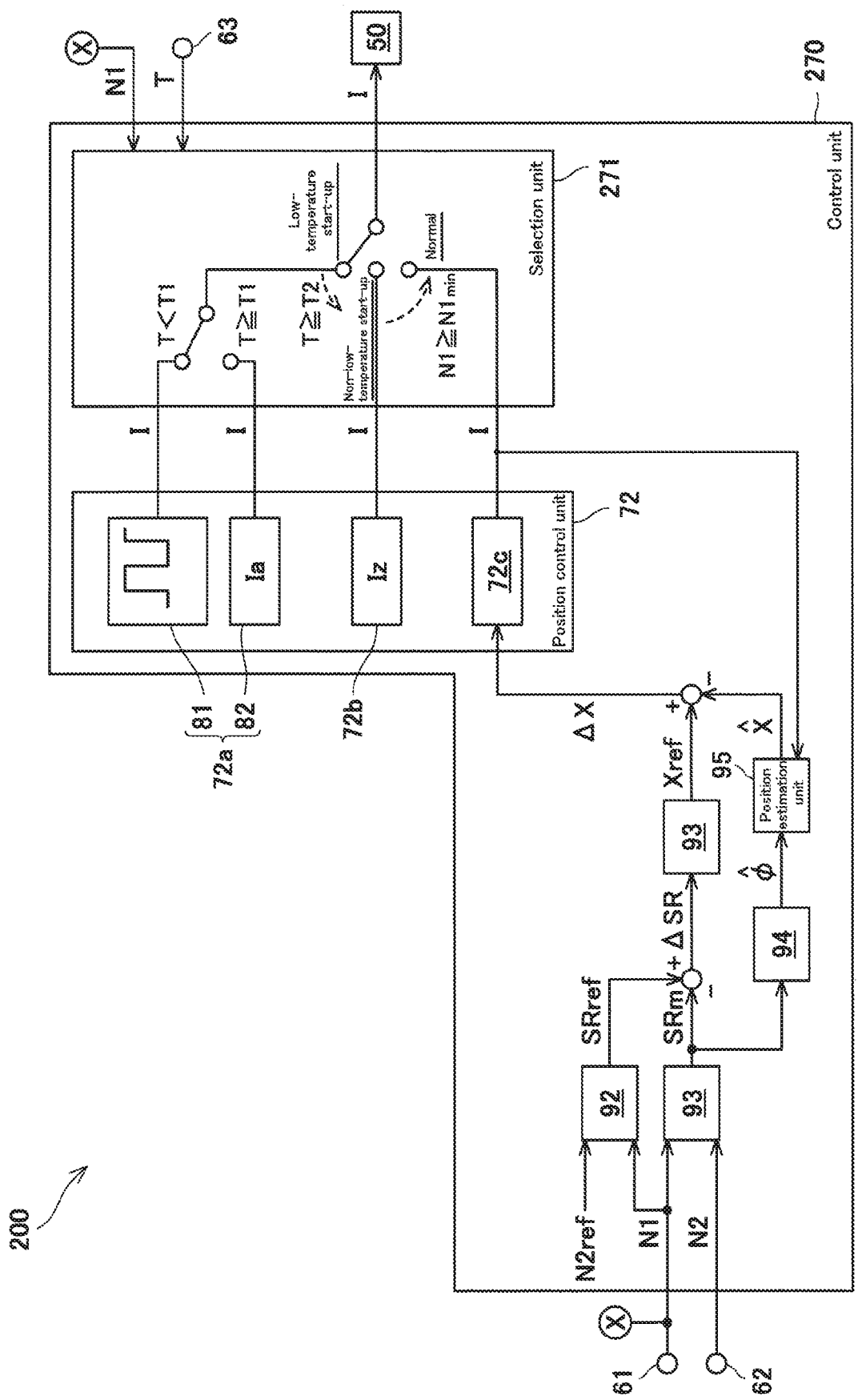
FIG. 10 is a block diagram of a controller according to Embodiment 2.
Figure 11:
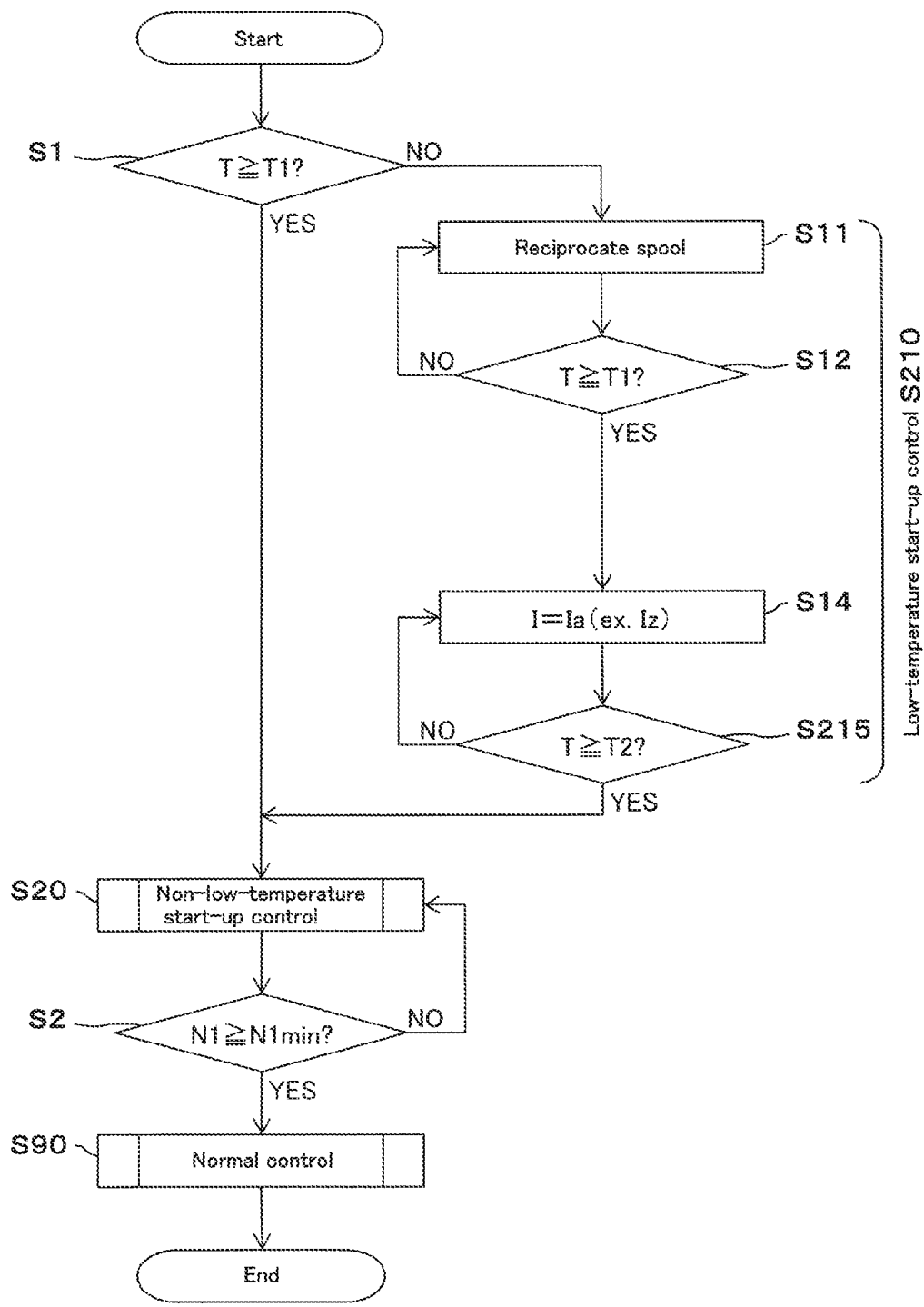
FIG. 11 is a flowchart of a control performed by the controller of FIG. 10.
Figure 12:
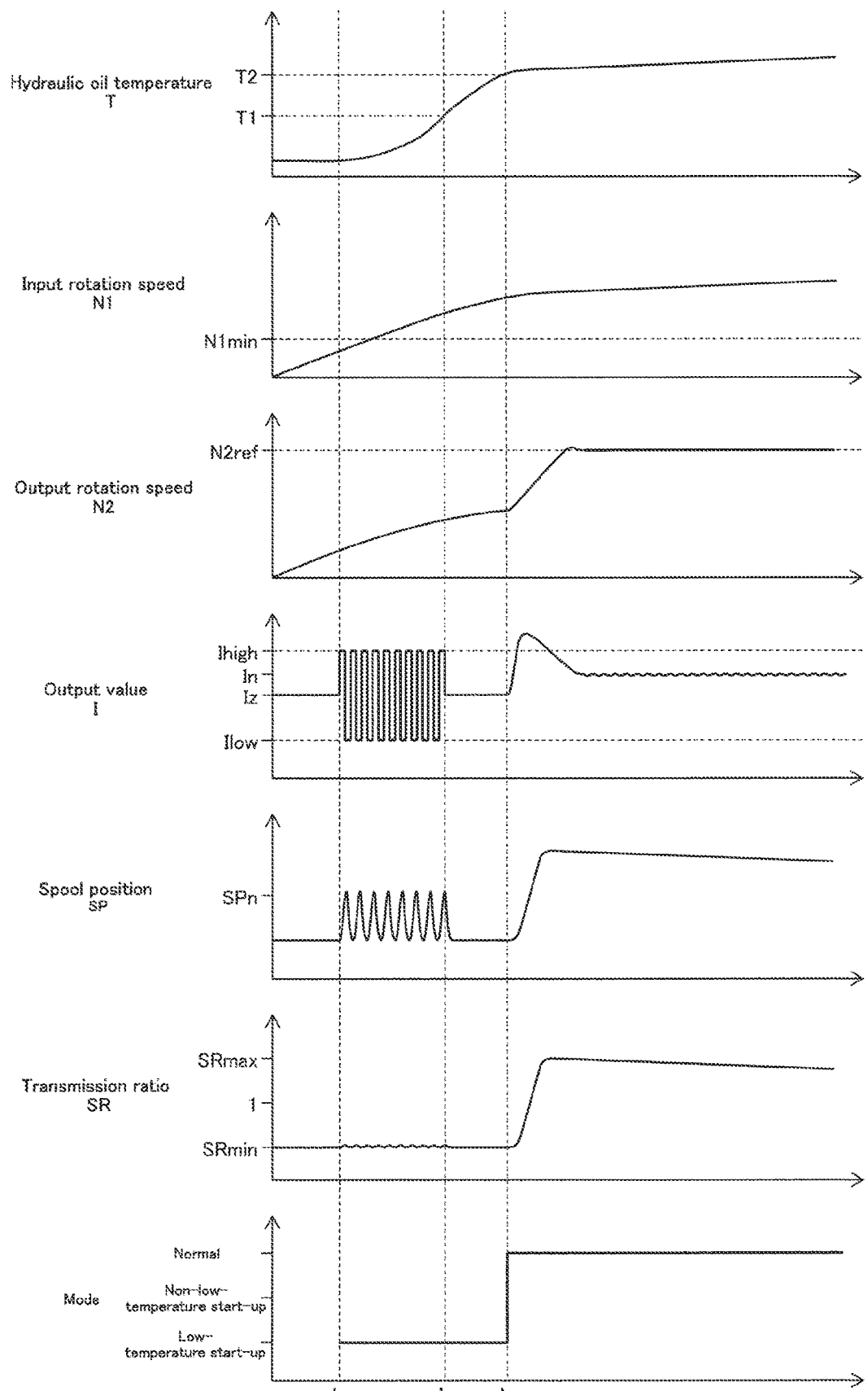
FIG. 12 is a time chart showing an example of changes over time of the hydraulic oil temperature and others, in a case where the control of FIG. 11 is performed.

As shown in FIGS. 10 to 12, in the controller 200, during a low-temperature start-up control S210, a selection unit 271 determines whether or not the hydraulic oil temperature T has reached a second reference temperature T2 which is higher than the reference temperature T1, while the low-temperature start-up control unit 72a is outputting the driving signal of the biasing mechanism actuation value Ia set by the second signal setting section 82 (S215). The second reference temperature T2 is, for example, 0 to 30 degrees C. In a case where the hydraulic oil temperature T has not reached the second reference temperature T2 (the hydraulic oil temperature T is lower than the second reference temperature T2) (S215: NO), the low-temperature start-up control unit 72a continues to output the driving signal of the biasing mechanism actuation value Ia (S14). At a time point when the hydraulic oil temperature T has reached the second reference temperature T2 (S214: YES), the low-temperature start-up control S210 is terminated (see the time point t3 of FIG. 12).

As in Embodiment 1, in the present embodiment, the roller position X is kept at the predetermined position (lower limit point Xmin) by the action of the biasing mechanism 50a and the hydraulic actuator 50 is placed motionlessly before the normal control S90 is initiated. Therefore, the control accuracy of the transmission ratio SR just after the normal control S90 is initiated can be made high. Since there is a standby (waiting) time before the normal control S90 is initiated, until the hydraulic oil temperature T has reached the second reference temperature T2, the normal control S90 can be initiated in a state in which the mobility of the oil is high. As a result, the control accuracy of the transmission ratio can be made high.

Embodiment 3

Regarding a controller 300 according to Embodiment 3, differences from the controller 100 according to Embodiment 1 will be described with reference to FIGS. 13 to 15.

Figure 13:
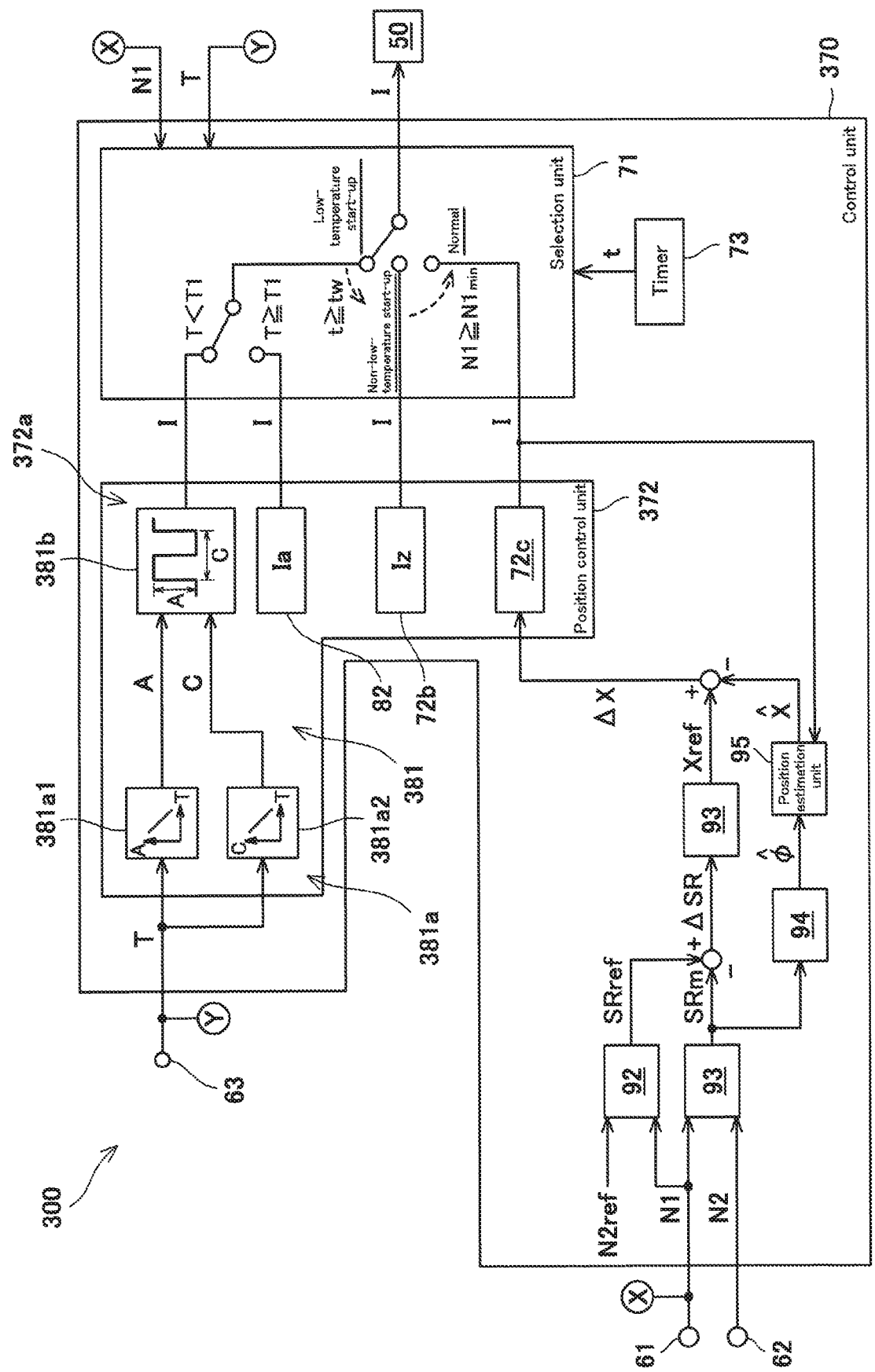
FIG. 13 is a block diagram of a controller according to Embodiment 3.

As shown in FIG. 13, in the controller 300, a first signal setting section 381 of a low-temperature start-up control unit 372a of a position control unit 372 includes a waveform parameter setting section 381a which variably sets a waveform parameter of a pulse signal, and a waveform deciding section 381b which decides the waveform of the pulse signal based on the waveform parameter set by the waveform parameter setting section 381a. The waveform parameter setting section 381a includes, for example, a wave height setting section 381a1 which sets a wave height A of the pulse signal based on the hydraulic oil temperature T detected by the oil temperature sensor 63, and a cycle setting section 381a2 which sets a cycle (pulse width) C of the pulse signal based on the hydraulic oil temperature T detected by the oil temperature sensor 63.

The wave height setting section 381a1 sets the wave height A so that the wave height A is increased (larger) as the hydraulic oil temperature T is lower. The cycle setting section 381a2 sets the cycle C so that the cycle C is increased as the hydraulic oil temperature T is lower.

Figure 14:
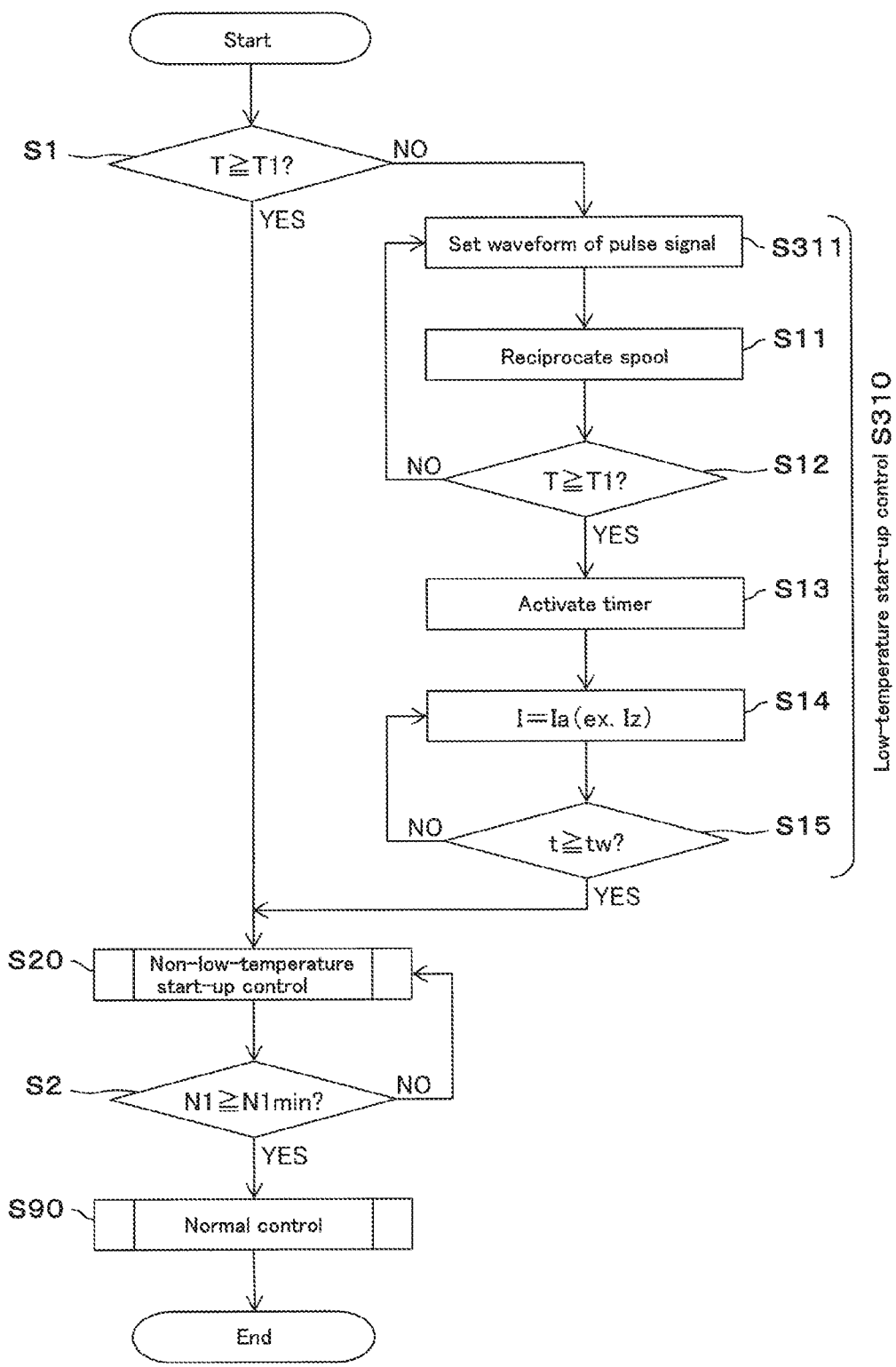
FIG. 14 is a flowchart of a control performed by the controller of FIG. 13.
Figure 15:
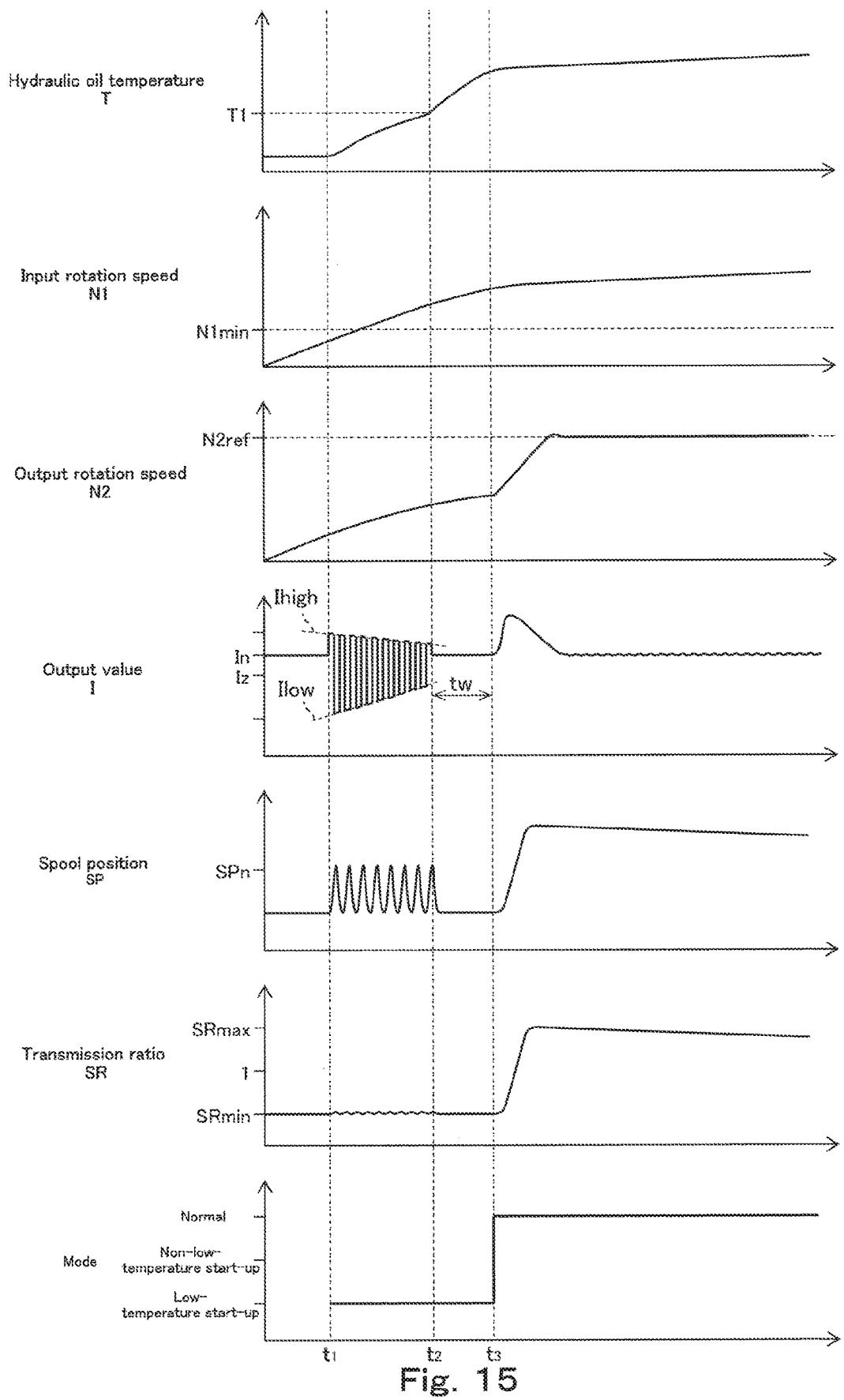
FIG. 15 is a time chart showing an example of changes over time of the hydraulic oil temperature and others, in a case where the control of FIG. 14 is performed.

As shown in FIGS. 14 and 15, in the controller 300, when a low-temperature start-up control S310 is initiated, the waveform parameter setting section 381a sets the waveform parameter based on the hydraulic oil temperature T until the hydraulic oil temperature T reaches the reference temperature T1 (S311), and the pulse signal having the waveform decided by the waveform deciding section 381b is output as the driving signal (S12). With the reciprocating motion of the spool 55a, the hydraulic oil temperature T is increased. With the increase in the hydraulic oil temperature T, the wave height is gradually reduced. At this time, the wave height A may be reduced in such a manner that the high value Ihigh and the low value Ilow gradually becomes close to the zero value Iz. The cycle (pulse width) C is gradually shortened with the increase in the hydraulic oil temperature T, although this is not shown in detail in FIG. 15.

In a case where the hydraulic oil temperature T is low, the driving signal for directing a greater reciprocating motion of the spool 55a is output. In this way, circulation of the oil can be facilitated, and the hydraulic oil temperature T can be quickly increased even when the mobility of the oil is low. Even when the spool 55a is greatly reciprocated, the mobility of the oil is low and the responsivity of the spool 55a is low. Therefore, it becomes possible to prevent a situation in which the transmission ratio SR changes to a value in the speed increase side and the output rotation speed N2 becomes excessive. In a case where the hydraulic oil temperature is high, the movement amount of the spool 55a is reduced. By doing so, it becomes possible to reduce time required for the roller position X to be kept at the predetermined position (lower limit point Xmin) and the hydraulic actuator 50 to be placed motionlessly thereafter.

Embodiment 4

Next, regarding Embodiment 4, differences from Embodiment 1 will be mainly described. Turning back to FIG. 1, the IDG1 according to Embodiment 1 will be described.

In Embodiment 1, the IDG1 has a series configuration. The driving power transmission path of the CSD 4 does not include a path which bypasses the toroidal CVT10. The input path 5 of the CSD 4 includes an IDG input shaft 151 to which the rotational driving power of the engine rotary shaft is input, and an input gear 152 which transmits the rotation of the IDG input shaft 151 to the toroidal CVT10. The input gear 152 includes a driving gear 153 provided at the IDG input shaft 151 and a driven gear 154 which is provided at the IDG input shaft 151 and is in mesh with the driving gear 153. The IDG input shaft 151 is parallel to the CVT axis line A1 and the input gear 152 is a parallel shaft gear pair. The output path 6 of the CSD 4 includes an output gear 161 which transmits the rotation output from the toroidal CVT10 to the generator shaft 7. The generator shaft 7 is parallel to the CVT axis line A1. The output gear 161 is a parallel shaft gear train. The output gear 161 includes a driving gear 162 provided at the CVT output shaft 12, a driven gear 163 provided at the generator shaft 7, one or more (e.g., two) idle gears 164a, 164b which transmit the rotation of the driving gear 162 to the driven gear 163. The gears 162, 164a, 164b, and 163 are in mesh with each other in this order.

In Embodiment 1, the toroidal CVT10 has a center input configuration. The input discs 13A, 13B are disposed back-to-back on the CVT input shaft 11. The driven gear 154 forming a downstream end of the input path 5 is secured onto the CVT input shaft 11 and disposed between the input discs 13A, 13B. The CVT output shaft 12 is inserted into the CVT input shaft 11 with a hollow structure. The CVT output shaft 12 includes two protruding parts 12a, 12b protruding from the CVT output shaft 11. The first output disc 14A is provided at the first protruding part 12a and faces the first input disc 13A. In this structure, the first cavity 15A is formed. The second output disc 14B is provided at the second protruding part 12b and faces the second input disc 13B. In this structure, the second cavity 15B is formed. The driving gear 162 forming an upstream end of the output path 6 is provided at the second protruding part 12b and disposed on a side opposite to the first input disc 12A with respect to the second output disc 12B corresponding to the second protruding part 12b. The clamping mechanism 18 is provided at the output discs 14A, 14B and the CVT output shaft 12.

Figure 16:
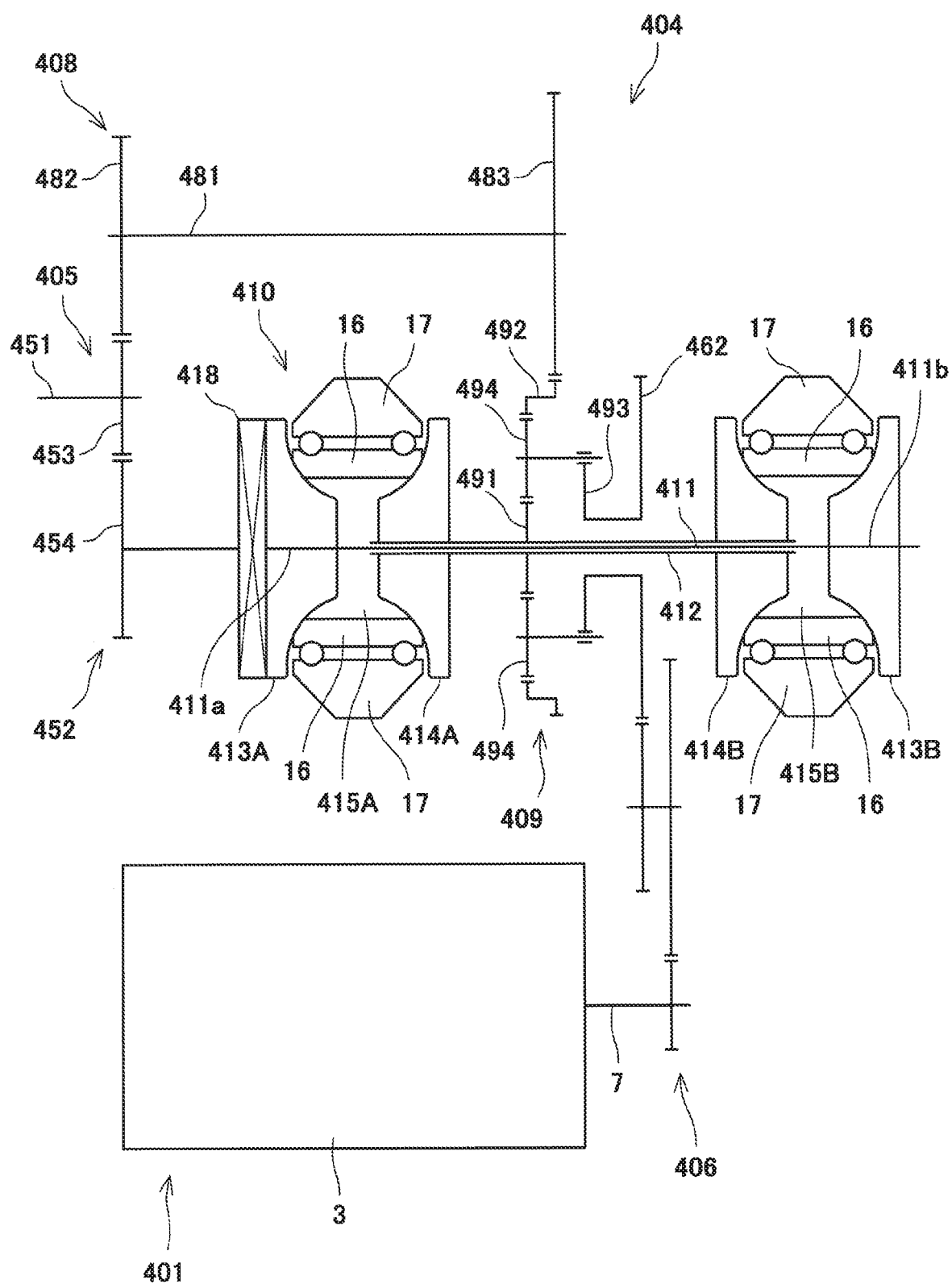
FIG. 16 is a skeleton diagram of an integrated drive generator (IDG) according to Embodiment 4.

As shown in FIG. 16, in Embodiment 4, a toroidal CVT 410 has a center output configuration instead of the center input configuration. Output discs 414A, 414B are disposed back-to-back on a CVT output shaft 412. A driving gear 462 of an output path 406 is disposed between the output discs 414A, 414B. A CVT input shaft 411 is inserted into the CVT output shaft 412 with a hollow structure, and includes two protruding parts 411a, 411b. A first input disc 413A is provided at the first protruding part 411a and faces the first output disc 414A. In this structure, a first cavity 415A is formed. A second input disc 413B is provided at the second protruding part 411b and faces the second output disc 414B. In this structure, a second cavity 415B is formed. A driven gear 454 of an input path 405 is provided on the first protruding part 411a. A clamping mechanism 418 is provided at the input discs 413A, 413B, and the protruding parts 411a, 411b.

In Embodiment 4, an IDG 401 has a power split configuration instead of the series configuration. A driving power transmission path of a CSD 404 includes a power dividing path 408 which branches from the input path 405 and bypasses the toroidal CVT410. The CSD 404 includes an epicyclic gear mechanism 409 connected to the toroidal CVT410, the downstream end of the power dividing path 408, and the upstream end of the output path 406. Since the IDG401 has the center output configuration, the epicyclic gear mechanism 409 and the driving gear 462 are disposed between the output discs 414A, 414B.

The power dividing path 408 includes a power dividing shaft 481, an upstream gear 482 which is provided at the power dividing shaft 481 and is in mesh with a driving gear 453 of the input path 405, and a downstream gear 483 provided at the power dividing shaft 481. The epicyclic gear mechanism 409 includes a sun gear 491, a ring gear 492, a carrier 493, and a planet gear 494. The epicyclic gear mechanism 409 is placed coaxially with a CVT axis line A1. The sun gear 491 is provided on the CVT output shaft 412. The ring gear 492 includes an external tooth and an internal tooth. The downstream gear 483 of the power dividing path 408 is in mesh with the external tooth of the ring gear 492. The planet gear 494 is in mesh with the internal tooth of the sun gear 491 and the internal tooth of the ring gear 492. The planet gear 494 is rotatably supported on the carrier 493. A driving gear 462 of the output path 406 is provided at the carrier 493. A CVT output shaft 412 penetrates the carrier 493. The sun gear 491, the ring gear 492, and the carrier 493 are not fixed and are rotatable relative to each other. The planet gear 494 is rotatable around its axis or is able to revolve (revolvable).

The rotational driving power of an IDG input shaft 451 is input to the toroidal CVT 410 via the input gear 452. The rotational driving power is also sent to the power dividing path 408 via the input gear 452. The rotation output from the toroidal CVT 410 is input to the sun gear 491. The rotation output from the power dividing path 408 is input to the ring gear 492. These two rotations are put together in the epicyclic gear mechanism 409 and output to the carrier 493. Then, the rotation is transmitted to the generator shaft 7 through the output path 406.

The controllers 100, 200, and 300 (see FIGS. 6, 11, and 13) of Embodiment 1 to Embodiment 3 are applicable to the IDG401 of FIG. 16 as well as the IDG of FIG. 1.

Modified Example

The embodiments have been described above. The above-described configuration is exemplary, and can be changed within the scope of the invention.

For example, as the condition used to determine whether or not to terminate the low-temperature start-up control, the first condition in which the standby time tw has passed (see S15 of FIG. 7) is used in Embodiment 1, while the second condition in which the hydraulic oil temperature T has reached the second reference temperature T2 (see S215 of FIG. 10) is used in Embodiment 2. As the condition used to determine whether or not to terminate the low-temperature start-up control, both of the first condition and the second condition may be used. In that case, the low-temperature start-up control may be terminated when one of the first and second conditions is met, or may be terminated when both of the first and second conditions are met. Although in Embodiment 3, the first condition is used as the condition used to determine whether or not to terminate the low-temperature start-up control (see S15 of FIG. 13), the second condition may be used instead of or in addition to the first condition.

The toroidal CVT may have the center input configuration and the IDG may have the power split configuration, or the toroidal CVT may have the center output configuration and the IDG may have the series configuration. Although in Embodiment 1 and Embodiment 4, the toroidal CVTs 10, 410 have a double cavity configuration and a half toroidal configuration, the controller is applicable to a single cavity configuration and a full toroidal configuration.

The toroidal CVTs of the above-described embodiments are not limited to the use in the electric power generation apparatus for the aircraft, and may be used in electric power generation apparatus for other uses, or in uses of automobiles or industrial machines.

REFERENCE SIGNS LIST 10, 410 toroidal continuously variable transmission (toroidal CVT)
16 power roller
50 hydraulic actuator
50a biasing mechanism
55a spool
72, 372 position control unit
95 position estimation unit
100, 200, 300 controller
S10, S210, S310 low-temperature start-up control
S20 non-low-temperature start-up control
S90 normal control
A wave height of pulse signal
I output value of driving signal
SR transmission ratio
T hydraulic oil temperature
T1 reference temperature
T2 second reference temperature
tw standby time
X roller position
Xmin lower limit point
Xref command value of roller position
^X estimated value of roller position
ΔX deviation of roller position

The invention claimed is:

1. A controller of a toroidal continuously variable transmission in which a transmission ratio is continuously changed depending on a roller position of a power roller, the controller comprising:
    a hydraulic actuator which changes the roller position; and
    a position control unit which outputs a driving signal to the hydraulic actuator to control the roller position,
    wherein the hydraulic actuator includes a biasing mechanism which forcibly keeps the roller position at a predetermined position in a case where the driving signal meets a predetermined condition,
    wherein the position control unit is configured to perform a start-up control during start-up of the toroidal continuously variable transmission, and
    wherein during the start-up control, the position control unit is configured to
    output the driving signal to reciprocate a spool of the hydraulic actuator in a case where a temperature of hydraulic oil supplied to the hydraulic actuator is lower than a reference temperature, and
    output the driving signal which meets the predetermined condition to keep the roller position at the predetermined position in a case where the temperature of the hydraulic oil has become equal to or higher than the reference temperature thereafter.

2. The controller of the toroidal continuously variable transmission according to claim 1, further comprising:
    a position estimation unit which estimates the roller position based on an output value of the driving signal, wherein during start-up of the toroidal continuously variable transmission, the position control unit is configured to perform the start-up control before the position control unit performs a normal control in which an output value of the driving signal is derived based on a deviation between a command value of the roller position and an estimated value of the roller position which is estimated by the position estimation unit, and wherein the position estimation unit is configured to set the predetermined position to an initial value of the estimated value, when the start-up control is terminated and the normal control is initiated.

3. The controller of the toroidal continuously variable transmission according to claim 2, wherein during the start-up control, the position control unit is configured to continue to output the driving signal which meets the predetermined condition until a standby time required for the spool to reach the predetermined position passes, in a case where the temperature of the hydraulic oil has become equal to or higher than the reference temperature after the position control unit output the driving signal to reciprocate the spool of the hydraulic actuator.

4. The controller of the toroidal continuously variable transmission according to claim 2, wherein during the start-up control, the position control unit is configured to continue to output the driving signal which meets the predetermined condition until the temperature of the hydraulic oil becomes equal to or higher than a second reference temperature higher than the reference temperature, in a case where the temperature of the hydraulic oil has become equal to or higher than the reference temperature after the position control unit output the driving signal to reciprocate the spool of the hydraulic actuator.

5. The controller of the toroidal continuously variable transmission according to claim 2, wherein during the start-up control, the position control unit is configured to output a pulse signal as the driving signal in a case where the temperature of the hydraulic oil supplied to the hydraulic actuator is lower than the reference temperature, and to set a wave height of the pulse signal to a smaller value as the temperature of the hydraulic oil is higher.

6. The controller of the toroidal continuously variable transmission according to claim 2, wherein the predetermined condition is a condition in which an output value of the driving signal is a zero value or a negative value, and wherein the biasing mechanism is a safety mechanism which forcibly returns the roller position to a lower limit point, in a case where the driving signal meets the predetermined condition.

7. The controller of the toroidal continuously variable transmission according to claim 1, wherein during the start-up control, the position control unit is configured to continue to output the driving signal which meets the predetermined condition until a standby time required for the spool to reach the predetermined position passes, in a case where the temperature of the hydraulic oil has become equal to or higher than the reference temperature after the position control unit output the driving signal to reciprocate the spool of the hydraulic actuator.

8. The controller of the toroidal continuously variable transmission according to claim 7, wherein during the start-up control, the position control unit is configured to continue to output the driving signal which meets the predetermined condition until the temperature of the hydraulic oil becomes equal to or higher than a second reference temperature higher than the reference temperature, in a case where the temperature of the hydraulic oil has become equal to or higher than the reference temperature after the position control unit output the driving signal to reciprocate the spool of the hydraulic actuator.

9. The controller of the toroidal continuously variable transmission according to claim 7, wherein during the start-up control, the position control unit is configured to output a pulse signal as the driving signal in a case where the temperature of the hydraulic oil supplied to the hydraulic actuator is lower than the reference temperature, and to set a wave height of the pulse signal to a smaller value as the temperature of the hydraulic oil is higher.

10. The controller of the toroidal continuously variable transmission according to claim 7, wherein the predetermined condition is a condition in which an output value of the driving signal is a zero value or a negative value, and wherein the biasing mechanism is a safety mechanism which forcibly returns the roller position to a lower limit point, in a case where the driving signal meets the predetermined condition.

11. The controller of the toroidal continuously variable transmission according to claim 1, wherein during the start-up control, the position control unit is configured to continue to output the driving signal which meets the predetermined condition until the temperature of the hydraulic oil becomes equal to or higher than a second reference temperature higher than the reference temperature, in a case where the temperature of the hydraulic oil has become equal to or higher than the reference temperature after the position control unit output the driving signal to reciprocate the spool of the hydraulic actuator.

12. The controller of the toroidal continuously variable transmission according to claim 11, wherein during the start-up control, the position control unit is configured to output a pulse signal as the driving signal in a case where the temperature of the hydraulic oil supplied to the hydraulic actuator is lower than the reference temperature, and to set a wave height of the pulse signal to a smaller value as the temperature of the hydraulic oil is higher.

13. The controller of the toroidal continuously variable transmission according to claim 11, wherein the predetermined condition is a condition in which an output value of the driving signal is a zero value or a negative value, and wherein the biasing mechanism is a safety mechanism which forcibly returns the roller position to a lower limit point, in a case where the driving signal meets the predetermined condition.

14. The controller of the toroidal continuously variable transmission according to claim 1, wherein during the start-up control, the position control unit is configured to output a pulse signal as the driving signal in a case where the temperature of the hydraulic oil supplied to the hydraulic actuator is lower than the reference temperature, and to set a wave height of the pulse signal to a smaller value as the temperature of the hydraulic oil is higher.

15. The controller of the toroidal continuously variable transmission according to claim 14,
   wherein the predetermined condition is a condition in which an output value of the driving signal is a zero value or a negative value, and
   wherein the biasing mechanism is a safety mechanism which forcibly returns the roller position to a lower limit point, in a case where the driving signal meets the predetermined condition.

16. The controller of the toroidal continuously variable transmission according to claim 1,
   wherein the predetermined condition is a condition in which an output value of the driving signal is a zero value or a negative value, and
   wherein the biasing mechanism is a safety mechanism which forcibly returns the roller position to a lower limit point, in a case where the driving signal meets the predetermined condition.

\* \* \* \* \*